(12) United States Patent
Lin et al.

(10) Patent No.: US 12,356,127 B2
(45) Date of Patent: Jul. 8, 2025

(54) PORT DETECTION METHOD AND APPARATUS

(71) Applicant: Huawei Technologies Co., Ltd., Shenzhen (CN)

(72) Inventors: Huafeng Lin, Dongguan (CN); Enyu Zhou, Dongguan (CN); Xiaofei Zeng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 230 days.

(21) Appl. No.: 17/984,325

(22) Filed: Nov. 10, 2022

(65) Prior Publication Data

US 2023/0079705 A1 Mar. 16, 2023

Related U.S. Application Data

(63) Continuation of application No. PCT/CN2020/132607, filed on Nov. 30, 2020.

(30) Foreign Application Priority Data

May 11, 2020 (CN) .......................... 202010392962.1

(51) Int. Cl.
H04Q 11/00 (2006.01)
H04B 10/61 (2013.01)

(52) U.S. Cl.
CPC ....... *H04Q 11/0067* (2013.01); *H04B 10/614* (2013.01); *H04Q 2011/0079* (2013.01)

(58) Field of Classification Search
CPC ....... H04Q 11/0067; H04Q 2011/0079; H04Q 2011/0083; H04Q 11/0062; H04B 10/614;

(Continued)

(56) References Cited

U.S. PATENT DOCUMENTS 8,811,820 B2 8/2014 Dahlfort et al.
9,438,513 B2 9/2016 Gronvall et al.
(Continued)

FOREIGN PATENT DOCUMENTS

CN 102118658 A 7/2011
CN 102334248 A 1/2012
(Continued)

OTHER PUBLICATIONS

Bentz Christopher M et al, "Field Trial With a FTTH/PON Monitoring Technique Based on Unique Wavelength Selective-Mirror Combinations [Invited]," vol. 5, No. 10, Jul. 5, 2013, XP011531142, total 7 pages.

(Continued)

*Primary Examiner* — Abbas H Alagheband
(74) *Attorney, Agent, or Firm* — Slater Matsil, LLP

(57) ABSTRACT

This application provides a port detection method and apparatus. In the technical solutions in this application, an OLT or an ONU may determine, based on at least two wavelengths and a preset correspondence, port information that is of an optical splitter and that corresponds to the ONU. That is, a branch port directly or indirectly connected to the ONU is defined by using the at least two wavelengths. In this way, different branch ports can be distinguished by using combinations of a plurality of wavelengths, to define a large quantity of branch ports of the optical splitter by using free combinations of a small quantity of wavelengths.

16 Claims, 8 Drawing Sheets

(58) Field of Classification Search
CPC ............ H04B 10/0779; H04B 10/0775; H04B 10/272; H04B 10/0795; H04B 10/07955; H04B 10/07957; H04J 14/0221; H04J 14/0282; H04J 14/02
USPC .......................................................... 398/58
See application file for complete search history.

(56) References Cited

U.S. PATENT DOCUMENTS

| | | | |
|---|---|---|---|
| 2006/0110161 A1* | 5/2006 | Cho .................. | H04J 14/0246 398/72 |
| 2008/0267628 A1* | 10/2008 | Li ...................... | H04B 10/2755 398/79 |
| 2012/0263458 A1* | 10/2012 | Wen ................... | H04B 10/071 398/28 |
| 2012/0288273 A1 | 11/2012 | Pöhlmann et al. | |
| 2014/0233954 A1* | 8/2014 | Lee ................... | H04J 14/0246 398/72 |
| 2015/0030328 A1* | 1/2015 | Fukuda .............. | H04L 41/12 398/58 |
| 2015/0139637 A1* | 5/2015 | Vall-Llosera ...... | G01M 11/3172 398/14 |
| 2017/0111119 A1* | 4/2017 | Yoo .................. | H04B 10/07955 |
| 2023/0079705 A1 | 3/2023 | Lin et al. | |

FOREIGN PATENT DOCUMENTS

| | | | | |
|---|---|---|---|---|
| CN | 102665152 A | 9/2012 | | |
| CN | 103002359 A | 3/2013 | | |
| CN | 103107842 A | 5/2013 | | |
| CN | 103281605 A | 9/2013 | | |
| CN | 103338069 A | 10/2013 | | |
| CN | 105337656 A | 2/2016 | | |
| CN | 105352594 A | 2/2016 | | |
| CN | 106160840 A | 11/2016 | | |
| CN | 106685522 A | 5/2017 | | |
| CN | 108512595 A | 9/2018 | | |
| CN | 110933531 A | * | 3/2020 | ......... H04Q 11/0067 |
| CN | 110996193 A | 4/2020 | | |
| EP | 1701580 A2 | 9/2006 | | |
| EP | 3242424 A1 | 11/2017 | | |
| JP | H1022948 A | 1/1998 | | |
| JP | 2000106682 A | 4/2000 | | |
| JP | 2006050143 A | 2/2006 | | |
| JP | 2006203823 A | 8/2006 | | |
| JP | 2006292917 A | 10/2006 | | |
| JP | 2010154063 A | 7/2010 | | |
| JP | 2012060290 A | 3/2012 | | |
| JP | 2015535413 A | 12/2015 | | |
| JP | 2016524396 A | 8/2016 | | |
| WO | WO-2015184593 A1 | * | 12/2015 | ........... H04B 10/572 |
| WO | 2018058624 A1 | 4/2018 | | |

OTHER PUBLICATIONS

Zhang, X., et al., "Remote coding scheme based on waveguide Bragg grating in PLC splitter chip for PON monitoring", Optics Express 4351, vol. 24, No. 5, Feb. 22, 2016, 14 Pages.

* cited by examiner

PORT DETECTION METHOD AND APPARATUS

CROSS-REFERENCE TO RELATED APPLICATIONS

This application is a continuation of International Application No. PCT/CN2020/132607, filed on Nov. 30, 2020, which claims priority to Chinese Patent Application No. 202010392962.1, filed on May 11, 2020. The disclosures of the aforementioned applications are hereby incorporated by reference in their entireties.

TECHNICAL FIELD

This application relates to the communication field, and more specifically, to a port detection method and apparatus.

BACKGROUND

A passive optical network (PON) system includes at least three types of devices: an optical line termination (OLT), an optical distribution network (ODN), and an optical network unit (ONU). The ODN may include one or more optical splitters, and the one or more optical splitters can implement one-level or multi-level optical splitting of the ODN. A two-level optical splitting is used as an example. A first-level optical splitter 1 equally divides a received optical signal power, and separately transmits divided optical signal powers to an optical splitter 2 and an optical splitter 3 connected to branch ports of the first-level optical splitter 1. The optical splitter 2 and the optical splitter 3 are second-level optical splitters. Then, the optical splitter 2 and the optical splitter 3 separately equally divide received optical signal powers, and separately transmit divided optical signal powers to connected ONUs. A branch port of a last-level optical splitter in the ODN is used as an output port of the ODN. The ONU is connected to the output port of the ODN.

In an operation and maintenance process of a PON system, an accurate connection relationship between an ONU and a branch port of an optical splitter can provide correct resource management information for an operator or a customer, and this facilitates resource recovery and utilization. For example, when a user unsubscribes from a service, a connection between the user and an optical splitter can be canceled. An idle branch port of the optical splitter may be provided to another user for using, thereby avoiding a waste of resources.

A method for determining a connection relationship between an ONU and a branch port of an optical splitter is as follows: In a monitoring wavelength range outside a service wavelength, each branch port of an optical splitter reflects an optical signal of a specific wavelength in the monitoring wavelength range. In this way, an optical signal received by each ONU is different from that received by another ONU, so that a correspondence between each ONU and a specific wavelength can be determined. Further, a connection relationship between an ONU and a branch port of the optical splitter can be determined based on a correspondence between a wavelength and a branch port of the optical splitter when the optical splitter is factory-set.

However, due to a limitation of the monitoring wavelength range, in some cases, no sufficient wavelengths can be allocated to the optical splitter to distinguish different branch ports of the optical splitter. Consequently, the connection relationship between an ONU and a branch port of the optical splitter cannot be accurately determined.

SUMMARY

This application provides a port detection method and apparatus, to distinguish different branch ports of an optical splitter by using a small quantity of wavelengths, thereby accurately determining a connection relationship between an ONU and a branch port of the optical splitter.

According to a first aspect, this application provides a port detection method. The method includes: An optical line termination (OLT) sends optical signals of M wavelengths to at least one optical network unit (ONU), where the M wavelengths are different from each other, and M is an integer greater than 1. The OLT receives at least one piece of feedback information sent by a first ONU, where the at least one piece of feedback information is used to indicate optical power values of the optical signals of M wavelengths received by the first ONU, and the first ONU is any ONU in the at least one ONU. The OLT determines, based on magnitudes of the optical power values of the optical signals of M wavelengths, R wavelengths corresponding to the first ONU, where R is an integer greater than or equal to 2. The OLT determines, based on at least two wavelengths of the R wavelengths, port information of a first optical splitter corresponding to the first ONU, where a first branch port of the first optical splitter corresponds to the at least two wavelengths.

Optionally, the OLT can determine, based on a correspondence between a first branch port of the first optical splitter and at least two wavelengths, the port information that is of the first optical splitter and that corresponds to the first ONU. The correspondence between a first branch port of the first optical splitter and at least two wavelengths may be preconfigured in the OLT. In this way, after determining the at least two wavelengths, the OLT can determine, based on the preconfigured correspondence, that the first ONU is connected to the first branch port of the first optical splitter.

It should be noted that, the OLT may send the optical signals of M wavelengths to the at least one ONU by using a laser. The laser may be integrated into the OLT, or may be disposed independently of the OLT. When the laser is disposed independently of the OLT, the laser may be used as a part of an OLT system. Therefore, in this embodiment of this application, it is described that the OLT sends the optical signals of M wavelengths to the at least one ONU.

In the foregoing technical solution, the OLT determines, based on the at least two wavelengths, the port information that is of the first optical splitter and that corresponds to the first ONU. That is, in the foregoing technical solution, a branch port directly or indirectly connected to the first ONU is defined by using the at least two wavelengths. In this way, different branch ports can be distinguished by using combinations of a plurality of wavelengths, to define a large quantity of branch ports of the optical splitter by using free combinations of a small quantity of wavelengths. This helps avoid a problem of an insufficient quantity of monitoring wavelengths due to a limitation of a monitoring wavelength range, and helps accurately determine a connection relationship between an ONU and a branch port of the optical splitter.

With reference to the first aspect, in a possible implementation, optical power values of optical signals corresponding to the R wavelengths are less than a first preset value; or optical power values of optical signals corresponding to the R wavelengths are greater than a second preset value.

With reference to any one of the first aspect and the foregoing possible implementations, in another possible implementation, the R wavelengths are wavelengths corresponding to R minimum optical power values of the optical power values of the optical signals of M wavelengths; or the R wavelengths are wavelengths corresponding to R maximum optical power values of the optical power values of the optical signals of M wavelengths.

With reference to any one of the first aspect and the foregoing possible implementations, in another possible implementation, when there is a difference greater than a third preset threshold in differences between the optical power values of the optical signals of M wavelengths, the R wavelengths are the wavelengths corresponding to the R minimum optical power values of the optical power values of the optical signals of M wavelengths; or when there is a difference greater than a third preset threshold in differences between the optical power values of the optical signals of M wavelengths, the R wavelengths are the wavelengths corresponding to the R maximum optical power values of the optical power values of the optical signals of M wavelengths.

With reference to any one of the first aspect and the foregoing possible implementations, in another possible implementation, that the OLT determines, based on magnitudes of the optical power values of the optical signals of M wavelengths, R wavelengths corresponding to the first ONU includes: When a difference between a first optical power value and a second optical power value is greater than a third preset value, and the first optical power value is greater than the second optical power value, the OLT determines that a wavelength of an optical signal corresponding to the second optical power value is a wavelength corresponding to the first ONU, where the first optical power value and the second optical power value are any two of the optical power values of the optical signals of M wavelengths; or when a difference between a first optical power value and a second optical power value is greater than a third preset value, and the first optical power value is greater than the second optical power value, the OLT determines that a wavelength of an optical signal corresponding to the first optical power value is a wavelength corresponding to the first ONU, where the first optical power value and the second optical power value are any two of the optical power values of the optical signals of M wavelengths.

With reference to any one of the first aspect and the foregoing possible implementations, in another possible implementation, the first branch port is provided with a reflection point, where the reflection point is configured to reflect optical signals of the at least two wavelengths, or the reflection point is configured to reflect an optical signal of a wavelength in the M wavelengths other than the at least two wavelengths.

With reference to any one of the first aspect and the foregoing possible implementations, in another possible implementation, the optical signals of M wavelengths and the at least one piece of feedback information are carried in a physical layer operations administration and maintenance (PLOAM) message, an optical network terminal management and control interface (OMCI) message, or a data channel.

According to a second aspect, this application provides a port detection method. The method includes: An optical network unit ONU receives optical signals of M wavelengths sent by an optical line termination OLT, where the M wavelengths are different from each other, and M is an integer greater than 1. The ONU determines, based on magnitudes of received optical power values of the optical signals of M wavelengths, R wavelengths corresponding to the ONU, where R is an integer greater than or equal to 2. The ONU determines, based on at least two wavelengths of the R wavelengths, port information of a first optical splitter corresponding to the ONU, where a first branch port of the first optical splitter corresponds to the at least two wavelengths. The ONU sends feedback information to the OLT, where the feedback information is used to indicate the port information.

Optionally, the ONU can determine, based on a correspondence between a first branch port of the first optical splitter and at least two wavelengths, the port information of the first optical splitter corresponding to the ONU. The correspondence between a first branch port of the first optical splitter and at least two wavelengths may be preconfigured in the ONU. In this way, after determining the at least two wavelengths, the ONU can determine, based on the preconfigured correspondence, that the ONU is connected to the first branch port of the first optical splitter.

It should be noted that, the OLT may send the optical signals of M wavelengths to at least one ONU by using a laser. The laser may be integrated into the OLT, or may be disposed independently of the OLT. When the laser is disposed independently of the OLT, the laser may be used as a part of an OLT system. Therefore, in this embodiment of this application, it is described, in all cases, that the OLT sends the optical signals of M wavelengths to the at least one ONU.

In the foregoing technical solution, the ONU determines, based on the at least two wavelengths, the port information of the first optical splitter corresponding to the ONU. That is, in the foregoing technical solution, a branch port directly or indirectly connected to the ONU is defined by using the at least two wavelengths. In this way, different branch ports can be distinguished by using combinations of a plurality of wavelengths, to define a large quantity of branch ports of the optical splitter by using free combinations of a small quantity of wavelengths. This helps avoid a problem of an insufficient quantity of monitoring wavelengths due to a limitation of a monitoring wavelength range, and helps accurately determine a connection relationship between an ONU and a branch port of the optical splitter.

With reference to the second aspect, in a possible implementation, optical power values of optical signals corresponding to the R wavelengths are less than a first preset value; or optical power values of optical signals corresponding to the R wavelengths are greater than a second preset value.

With reference to any one of the second aspect and the foregoing possible implementations, in another possible implementation, the R wavelengths are wavelengths corresponding to R minimum optical power values of the optical power values of the optical signals of M wavelengths; or the R wavelengths are wavelengths corresponding to R maximum optical power values of the optical power values of the optical signals of M wavelengths.

With reference to any one of the second aspect and the foregoing possible implementations, in another possible implementation, when there is a difference greater than a third preset threshold in differences between the optical power values of the optical signals of M wavelengths, the R wavelengths are the wavelengths corresponding to the R minimum optical power values of the optical power values of the optical signals of M wavelengths; or when there is a difference greater than a third preset threshold in differences between the optical power values of the optical signals of M wavelengths, the R wavelengths are the wavelengths corresponding to the R maximum optical power values of the optical power values of the optical signals of M wavelengths.

With reference to any one of the second aspect and the foregoing possible implementations, in another possible implementation, that the ONU determines, based on magnitudes of received optical power values of the optical signals of M wavelengths, R wavelengths corresponding to the ONU includes: When a difference between a first optical power value and a second optical power value is greater than a third preset value, and the first optical power value is greater than the second optical power value, the ONU determines that a wavelength of an optical signal corresponding to the second optical power value is a wavelength corresponding to the first ONU, where the first optical power value and the second optical power value are any two of the optical power values of the optical signals of M wavelengths; or when a difference between a first optical power value and a second optical power value is greater than a third preset value, and the first optical power value is greater than the second optical power value, the ONU determines that a wavelength of an optical signal corresponding to the first optical power value is a wavelength corresponding to the first ONU, where the first optical power value and the second optical power value are any two of the optical power values of the optical signals of M wavelengths.

With reference to any one of the second aspect and the foregoing possible implementations, in another possible implementation, the first branch port is provided with a reflection point, where the reflection point is configured to reflect optical signals of the at least two wavelengths, or the reflection point is configured to reflect an optical signal of a wavelength in the M wavelengths other than the at least two wavelengths.

With reference to any one of the second aspect and the foregoing possible implementations, in another possible implementation, the optical signals of M wavelengths and the feedback information are carried in a PLOAM message, an OMCI message, or a data channel.

According to a third aspect, this application provides a passive optical network PON system, where the system includes an optical line termination OLT and at least one optical network unit ONU. The OLT is configured to send optical signals of M wavelengths to the at least one ONU, where the M wavelengths are different from each other, and M is an integer greater than 1. A first ONU in the at least one ONU is configured to send at least one piece of feedback information to the OLT, where the at least one piece of feedback information is used to indicate optical power values of the optical signals of M wavelengths received by the first ONU. The OLT is configured to determine, based on magnitudes of the optical power values of the optical signals of M wavelengths, R wavelengths corresponding to the first ONU, where R is a positive integer greater than or equal to 2. The OLT is further configured to determine, based on at least two wavelengths in the R wavelengths, port information of a first optical splitter corresponding to the first ONU, where a first branch port of the first optical splitter corresponds to the at least two wavelengths.

Optionally, the OLT can determine, based on a correspondence between a first branch port of the first optical splitter and at least two wavelengths, the port information that is of the first optical splitter and that corresponds to the first ONU. The correspondence between a first branch port of the first optical splitter and at least two wavelengths may be preconfigured in the OLT. In this way, after determining the at least two wavelengths, the OLT can determine, based on the preconfigured correspondence, that the first ONU is connected to the first branch port of the first optical splitter.

It should be noted that, the OLT may send the optical signals of M wavelengths to the at least one ONU by using a laser. The laser may be integrated into the OLT, or may be disposed independently of the OLT. When the laser is disposed independently of the OLT, the laser may be used as a part of an OLT system. Therefore, in this embodiment of this application, it is described, in all cases, that the OLT sends the optical signals of M wavelengths to the at least one ONU.

In the foregoing technical solution, the OLT determines, based on the at least two wavelengths, the port information that is of the first optical splitter and that corresponds to the first ONU. That is, in the foregoing technical solution, a branch port directly or indirectly connected to the first ONU is defined by using the at least two wavelengths. In this way, different branch ports can be distinguished by using combinations of a plurality of wavelengths, to define a large quantity of branch ports of the optical splitter by using free combinations of a small quantity of wavelengths. This helps avoid a problem of an insufficient quantity of monitoring wavelengths due to a limitation of a monitoring wavelength range, and helps accurately determine a connection relationship between an ONU and a branch port of the optical splitter.

With reference to the third aspect, in a possible implementation, optical power values of optical signals corresponding to the R wavelengths are less than a first preset value; or optical power values of optical signals corresponding to the R wavelengths are greater than a second preset value.

With reference to any one of the third aspect and the foregoing possible implementations, in another possible implementation, the R wavelengths are wavelengths corresponding to R minimum optical power values of the optical power values of the optical signals of M wavelengths; or the R wavelengths are wavelengths corresponding to R maximum optical power values of the optical power values of the optical signals of M wavelengths.

With reference to any one of the third aspect and the foregoing possible implementations, in another possible implementation, when there is a difference greater than a third preset threshold in differences between the optical power values of the optical signals of M wavelengths, the R wavelengths are the wavelengths corresponding to the R minimum optical power values of the optical power values of the optical signals of M wavelengths; or when there is a difference greater than a third preset threshold in differences between the optical power values of the optical signals of M wavelengths, the R wavelengths are the wavelengths corresponding to the R maximum optical power values of the optical power values of the optical signals of M wavelengths.

With reference to any one of the third aspect and the foregoing possible implementations, in another possible implementation, when a difference between a first optical power value and a second optical power value is greater than a third preset value, and the first optical power value is greater than the second optical power value, the OLT determines that a wavelength of an optical signal corresponding to the second optical power value is a wavelength corresponding to the first ONU, where the first optical power value and the second optical power value are any two of the optical power values of the optical signals of M wavelengths; or when a difference between a first optical power value and a second optical power value is greater than a third preset value, and the first optical power value is greater than the second optical power value, the OLT determines that a wavelength of an optical signal corresponding to the first optical power value is a wavelength corresponding to the first ONU, where the first optical power value and the second optical power value are any two of the optical power values of the optical signals of M wavelengths.

With reference to any one of the third aspect and the foregoing possible implementations, in another possible implementation, the first branch port is provided with a reflection point, where the reflection point is configured to reflect optical signals of the at least two wavelengths, or the reflection point is configured to reflect an optical signal of a wavelength in the M wavelengths other than the at least two wavelengths.

With reference to any one of the third aspect and the foregoing possible implementations, in another possible implementation, the optical signals of M wavelengths and the at least one piece of feedback information are carried in a PLOAM message, an OMCI message, or a data channel.

According to a fourth aspect, this application provides a passive optical network PON system, where the system includes an optical line termination OLT and at least one optical network unit ONU. The OLT is configured to send optical signals of M wavelengths to the at least one ONU, where the M wavelengths are different from each other, and M is an integer greater than 1. A first ONU in the at least one ONU is configured to determine, based on magnitudes of received optical power values of the optical signals of M wavelengths, R wavelengths corresponding to the first ONU, where R is an integer greater than or equal to 2. The first ONU is further configured to determine, based on at least two wavelengths of the R wavelengths, port information of a first optical splitter corresponding to the first ONU, where a first branch port of the first optical splitter corresponds to the at least two wavelengths. The first ONU is further configured to send feedback information to the OLT, where the feedback information is used to indicate the port information. The OLT is configured to determine the port information based on the feedback information.

Optionally, the ONU can determine, based on a correspondence between a first branch port of the first optical splitter and at least two wavelengths, the port information of the first optical splitter corresponding to the ONU. The correspondence between a first branch port of the first optical splitter and at least two wavelengths may be preconfigured in the ONU. In this way, after determining the at least two wavelengths, the ONU can determine, based on the preconfigured correspondence, that the ONU is connected to the first branch port of the first optical splitter.

It should be noted that, the OLT may send the optical signals of M wavelengths to the at least one ONU by using a laser. The laser may be integrated into the OLT, or may be disposed independently of the OLT. When the laser is disposed independently of the OLT, the laser may be used as a part of an OLT system. Therefore, in this embodiment of this application, it is described, in all cases, that the OLT sends the optical signals of M wavelengths to the at least one ONU.

In the foregoing technical solution, the ONU determines, based on the at least two wavelengths, the port information of the first optical splitter corresponding to the ONU. That is, in the foregoing technical solution, a branch port directly or indirectly connected to the ONU is defined by using the at least two wavelengths. In this way, different branch ports can be distinguished by using combinations of a plurality of wavelengths, to define a large quantity of branch ports of the optical splitter by using free combinations of a small quantity of wavelengths. This helps avoid a problem of an insufficient quantity of monitoring wavelengths due to a limitation of a monitoring wavelength range, and helps accurately determine a connection relationship between an ONU and a branch port of the optical splitter.

With reference to the fourth aspect, in a possible implementation, optical power values of optical signals corresponding to the R wavelengths are less than a first preset value; or optical power values of optical signals corresponding to the R wavelengths are greater than a second preset value.

With reference to any one of the fourth aspect and the foregoing possible implementations, in another possible implementation, the R wavelengths are wavelengths corresponding to R minimum optical power values of the optical power values of the optical signals of M wavelengths; or the R wavelengths are wavelengths corresponding to R maximum optical power values of the optical power values of the optical signals of M wavelengths.

With reference to any one of the fourth aspect and the foregoing possible implementations, in another possible implementation, when there is a difference greater than a third preset threshold in differences between the optical power values of the optical signals of M wavelengths, the R wavelengths are the wavelengths corresponding to the R minimum optical power values of the optical power values of the optical signals of M wavelengths; or when there is a difference greater than a third preset threshold in differences between the optical power values of the optical signals of M wavelengths, the R wavelengths are the wavelengths corresponding to the R maximum optical power values of the optical power values of the optical signals of M wavelengths.

With reference to any one of the fourth aspect and the foregoing possible implementations, in another possible implementation, the first ONU is specifically configured to: when a difference between a first optical power value and a second optical power value is greater than a third preset value, and the first optical power value is greater than the second optical power value, determine that a wavelength of an optical signal corresponding to the second optical power value is a wavelength corresponding to the first ONU, where the first optical power value and the second optical power value are any two of the optical power values of the optical signals of M wavelengths; or when a difference between a first optical power value and a second optical power value is greater than a third preset value, and the first optical power value is greater than the second optical power value, determine that a wavelength of an optical signal corresponding to the first optical power value is a wavelength corresponding to the first ONU, where the first optical power value and the second optical power value are any two of the optical power values of the optical signals of M wavelengths.

With reference to any one of the fourth aspect and the foregoing possible implementations, in another possible implementation, the first branch port is provided with a reflection point, where the reflection point is configured to reflect optical signals of the at least two wavelengths, or the reflection point is configured to reflect an optical signal of a wavelength in the M wavelengths other than the at least two wavelengths.

With reference to any one of the fourth aspect and the foregoing possible implementations, in another possible implementation, the optical signals of M wavelengths and the feedback information are carried in a PLOAM message, an OMCI message, or a data channel.

According to a fifth aspect, this application provides an optical splitter, where the optical splitter includes N first branch ports, each of the N first branch ports is provided with a reflection point, the reflection point of each first branch port is configured to reflect optical signals of a plurality of wavelengths, at least one optical signal in optical signals reflected by reflection points of any two of the first branch ports has a different wavelength, where N is an integer greater than 0.

In the foregoing technical solution, the optical splitter includes the branch port configured to reflect the optical signals of a plurality of wavelengths. In this way, different branch ports can be distinguished by using combinations of the plurality of wavelengths, to define a large quantity of branch ports of the optical splitter by using free combinations of a small quantity of wavelengths. This helps avoid a problem of an insufficient quantity of monitoring wavelengths due to a limitation of a monitoring wavelength range, and helps accurately determine a connection relationship between an ONU and a branch port of the optical splitter.

With reference to the fifth aspect, in a possible implementation, the optical splitter further includes K second branch ports, each of the K second branch ports is provided with a reflection point, the reflection point of each second branch port is configured to reflect an optical signal of one wavelength, wavelengths of optical signals reflected by reflection points of any two of the second branch ports are different, where K is an integer greater than 0.

In the foregoing technical solution, the optical splitter may further include the branch port configured to reflect the optical signal of one wavelength. In this way, for a same quantity of wavelengths, there may be more combination manners, which can further reduce a required quantity of monitoring wavelengths.

With reference to any one of the fifth aspect and the foregoing possible implementations, in another possible implementation, the optical splitter further includes a third branch port, and the third branch port is provided with no reflection point.

In the foregoing technical solution, the optical splitter may further include a branch port that does not reflect an optical signal of any wavelength. In this way, for a same quantity of wavelengths, there may be more combination manners, which can further reduce a required quantity of monitoring wavelengths.

With reference to any one of the fifth aspect and the foregoing possible implementations, in another possible implementation, N1 first branch ports of the N first branch ports are separately provided with one reflection point, and the reflection point is configured to reflect the optical signals of a plurality of wavelengths.

With reference to any one of the fifth aspect and the foregoing possible implementations, in another possible implementation, N2 first branch ports of the N first branch ports are separately provided with a plurality of reflection points, and the plurality of reflection points are configured to reflect the optical signals of a plurality of wavelengths.

With reference to any one of the fifth aspect and the foregoing possible implementations, in another possible implementation, the reflection point is formed by etching a grating on the branch port and/or plating a film on an end face of the branch port.

According to a sixth aspect, this application provides an OLT, where the OLT includes a module configured to implement the method according to any one of the first aspect or the possible implementations of the first aspect.

According to a seventh aspect, this application provides an ONU, where the ONU includes a module configured to implement the method according to any one of the second aspect or the possible implementations of the second aspect.

According to an eighth aspect, this application provides an OLT, where the OLT includes a processor and a communication interface. The processor and the interface circuit are coupled to each other, the communication interface is configured to communicate with another device, and the processor is configured to implement the method according to any one of the first aspect or the implementations of the first aspect.

In a possible implementation, the OLT further includes a memory, configured to store instructions to be executed by the processor, store input data required by the processor to run the instructions, or store data generated after the processor runs the instructions.

According to a ninth aspect, this application provides an ONU, where the ONU includes a processor and a communication interface. The processor and the interface circuit are coupled to each other, the communication interface is configured to communicate with another device, and the processor is configured to implement the method according to any one of the first aspect or the implementations of the first aspect.

In a possible implementation, the ONU further includes a memory, configured to store instructions to be executed by the processor, store input data required by the processor to run the instructions, or store data generated after the processor runs the instructions.

According to a tenth aspect, this application provides a port detection apparatus, where the port detection apparatus can be applied to devices such as an OLT or an ONU. The port detection apparatus is coupled to a memory to read and execute instructions stored in the memory, to enable the port detection apparatus to implement the method according to any one of the first aspect or the implementations of the first aspect or implement the method according to any one of the second aspect or the implementations of the second aspect.

In a possible design, the port detection apparatus is a chip or a system on chip.

According to an eleventh aspect, this application provides a chip, where the chip includes a processor and a communication interface. The processor and the interface circuit are coupled to each other, the communication interface is configured to communicate with another device, the processor is configured to implement the method according to any one of the first aspect or the implementations of the first aspect or implement the method according to any one of the second aspect or the implementations of the second aspect.

In a possible implementation, the chip further includes a memory, configured to store instructions to be executed by the processor, store input data required by the processor to run the instructions, or store data generated after the processor runs the instructions.

According to a twelfth aspect, an embodiment of this application provides a computer program product, where the computer program product includes computer instructions. When the computer instructions are executed, the method according to any one of the first aspect or the possible implementations of the first aspect is performed, or the method according to any one of the second aspect or the possible implementations of the second aspect is performed.

According to a thirteenth aspect, this application provides a computer-readable storage medium, where the storage medium stores computer instructions. When the computer instructions are executed, the method according to any one of the first aspect or the possible implementations of the first aspect is performed, or the method according to any one of the second aspect or the possible implementations of the second aspect is performed.

Based on the foregoing content, in embodiments of this application, the branch port of the optical splitter reflects or transmits at least two different wavelengths. The ONU determines one branch port by using the at least two different wavelengths. In this way, the large quantity of branch ports of the optical splitter can be defined by using the free combinations of a small quantity of wavelengths, and the connection relationship between an ONU and a branch port of the optical splitter can be accurately determined.

DETAILED DESCRIPTION OF ILLUSTRATIVE EMBODIMENTS

The following describes technical solutions of this application with reference to accompanying drawings.

Figure 1:
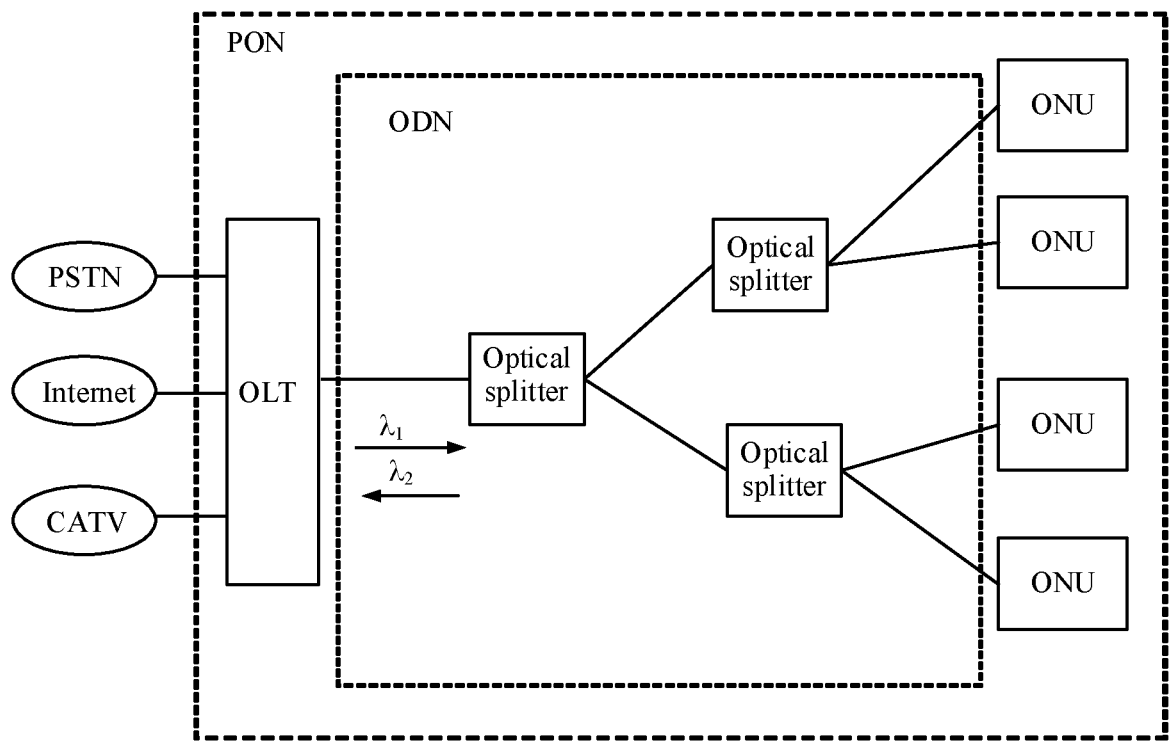
FIG. 1 is a schematic diagram of an architecture of a PON system to which a technical solution according to an embodiment of this application is applicable.

FIG. 1 is a schematic diagram of an architecture of a PON system to which a technical solution according to an embodiment of this application is applicable. A PON system shown in FIG. 1 may include an optical line termination (OLT), an optical distribution network (ODN), and at least one optical network unit (ONU). The ONU may be alternatively replaced with an optical network termination (ONT).

The ODN may include at least one optical splitter, and may further include an optical fiber. Specifically, the optical fiber may further include a feed fiber, a distribution fiber, and a drop fiber. The feed fiber is an optical fiber connected to the OLT and the ODN. The distribution fiber and the drop fiber may also be collectively referred to as a branch fiber. The drop fiber is an optical fiber connected between the optical splitter and an accessed ONU, and the distribution fiber is an optical fiber connected between optical splitters in the ODN. When the ODN is a one-level optical splitting network (that is, includes only a first-level optical splitter), the ODN includes only a feed fiber and a drop fiber, and no distribution fiber. When the ODN is a two-level optical splitting network (that is, includes a first-level optical splitter and a second-level optical splitter) or a multi-level optical splitting network (that is, includes a first-level optical splitter, a second-level optical splitter, . . . , and an M-level optical splitter), the ODN includes a feed fiber, a multi-level distribution fiber, and a drop fiber. For example, the ODN in FIG. 1 is a two-level optical splitting network, and the ODN includes a feed fiber, a multi-level distribution fiber, and a drop fiber.

The ONU is configured to receive data sent by the OLT, respond to a management command of the OLT, cache Ethernet data of a user, send the data to an uplink direction in a transmit window allocated by the OLT, and so on. The ONU may specifically include a bi-direction optical subassembly (BOSA). The BOSA may specifically include a transmitter optical subassembly (TOSA), a receiver optical subassembly (ROSA), and the like. The TOSA may be configured to send an optical signal, and the ROSA may be configured to receive an optical signal.

The OLT is a core component of an optical access network, and the OLT is configured to provide data, management, and the like for one or more accessed ONUs. The OLT may be configured to send an optical signal to at least one ONU, receive information fed back by the ONU, and process the information fed back by the ONU, other data, or the like.

The PON may specifically include a gigabit passive optical network (GPON), an Ethernet passive optical network (EPON), a 10G gigabit-capable passive optical network (XGPON), a 10G Ethernet passive optical network (10G EPON), and the like, where XGPON and 10G EPON may be collectively referred to as a 10G PON.

In a PON system, uplink and downlink optical signals may be transmitted in a same optical fiber in a time division multiplexing (TDM) manner. The OLT may broadcast data in a form of an optical signal by using a laser, and transmit the data to an ONU accessing the ODN. If a wavelength of an optical signal sent in a downlink direction (from the OLT to the ONU) is λ1, and a wavelength of an optical signal sent in the uplink direction (from the ONU to the OLT) is λ2, the optical signal whose wavelength is λ1 and the optical signal whose wavelength is λ2 may be transmitted in a same optical fiber in different slots. For example, as shown in FIG. 1, a wavelength in the downlink direction is λ1, working is performed in a TDM manner, and data sent by the OLT is broadcast to all branch fibers, and can reach all ONUs. A wavelength in the uplink direction is λ2, working is performed in a time division multiple access (TDMA) manner, and the ONU performs sending only in a licensed slot. Usually, in the GPON system, a wavelength of 1310 nm is used for uplink and a wavelength of 1490 nm is used for downlink. In the 10G PON system, a wavelength of 1270 nm is used for uplink, and a wavelength of 1577 nm is used for downlink. Certainly, the uplink and downlink optical signals may be alternatively transmitted by using different optical fibers.

In addition, the PON system may further establish a connection to a network or a device such as a public telephone switching network (PTSN), an internet (internet), or a cable television (CATV).

It should be understood that the at least one ONU in FIG. 1 may include an optical network termination (ONT), a multiplexer unit (MXU), and the like. The at least one ONU may be alternatively replaced with at least one ONT. Alternatively, at least one device that accesses the ODN may include both an ONU and an ONT. In this application, steps performed by the ONU may be alternatively performed by the ONT instead.

Figure 2:
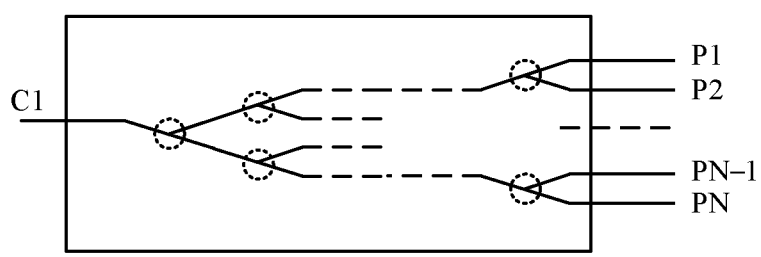
FIG. 2 is a schematic diagram of a structure of an optical splitter.

FIG. 2 is a schematic diagram of a structure of an optical splitter. As shown in FIG. 2, a split ratio of the optical splitter is 1:N, that is, there are one common end C1 and N branch ports (P1, ..., PN), where N is a positive integer. In a PON network, the common end C1 of the optical splitter may be connected to an OLT or to a branch port of a previous-level optical splitter by using a feed fiber. Each of the branch ports (P1, ..., PN) of the optical splitter may be connected to one ONU or to a common end of a next-level optical splitter by using one branch fiber.

The optical splitter may be alternatively an optical splitter with another split ratio, for example, an optical splitter with a split ratio of 2:N or 4:N. A specific structure of the optical splitter may be adjusted based on an actual application scenario. This is not limited in this application.

In an operation and maintenance process of a PON system, an accurate connection relationship between an ONU and a branch port of the optical splitter can provide correct resource management information for an operator or a customer, thereby facilitating resource recovery and utilization. For example, when a user unsubscribes from a service, a connection between the user and the optical splitter can be canceled. An idle branch port of the optical splitter may be provided to another user for using, thereby avoiding a waste of resources.

A method for determining a connection relationship between an ONU and a branch port of an optical splitter is as follows: In a monitoring wavelength range outside a service wavelength, each branch port of an optical splitter reflects an optical signal of a specific wavelength in the monitoring wavelength range. In this way, an optical signal received by each ONU is different from that received by another ONU, so that a correspondence between each ONU and a specific wavelength can be determined. Further, a connection relationship between an ONU and a branch port of the optical splitter can be determined based on a correspondence between a wavelength and a branch port of the optical splitter when the optical splitter is factory-set.

Figure 3:
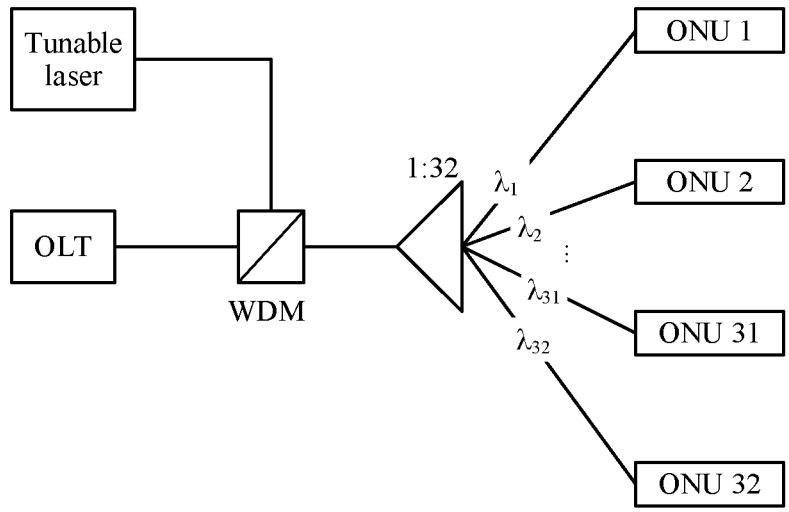
FIG. 3 is a schematic diagram of a port detection method.

For example, as shown in FIG. 3, one-level splitting is implemented in an ODN by using an optical splitter with a split ratio of 1:32. Each branch port of the optical splitter reflects an optical signal of a specific wavelength in a monitoring wavelength range, and transmits an optical signal of another wavelength. A tunable laser emits optical signals whose wavelengths are $\lambda 1$ to $\lambda 32$, and the ONU receives the optical signals whose wavelengths are $\lambda 1$ to $\lambda 32$. When an ONU 1 is connected to a branch port configured to reflect the optical signal of a wavelength $\lambda 1$, because the branch port of the optical splitter reflects the optical signal of a wavelength $\lambda 1$, and transmits an optical signal of another wavelength, the ONU 1 cannot receive the optical signal of a wavelength $\lambda 1$ or an optical power of the received optical signal of a wavelength $\lambda 1$ is low, and an optical power value of a received optical signal of another wavelength is normal. By analogy, an ONU 32 cannot receive the optical signal of a wavelength $\lambda 32$ or an optical power of the received optical signal of a wavelength $\lambda 32$ is low, and an optical power value of a received optical signal of another wavelength is normal. Based on this, a correspondence between an ONU N (N=1, ..., 32) and a wavelength $\lambda n$ can be learned. In addition, a correspondence between a branch port of the optical splitter and an ONU can be learned based on a correspondence between a wavelength and a branch port of the optical splitter when the optical splitter is factory-set.

Because the optical splitter has 32 branch ports, 32 optical signals of different wavelengths are required. However, because an operating temperature of a programmable logic controller (PLC) ranges from −40° C. to 85° C., and a grating wavelength drift is 0.01 nm/° C., to reflect an optical signal of a specific wavelength and transmit an optical signal of another wavelength, a reflection bandwidth needs to be greater than 1.25 nm. In addition, it is considered that a wavelength drift of the tunable laser is +/−3 GHz, a production deviation of a reflection grating is 0.2 nm, a reflection bandwidth of each wavelength is at least 1.6 nm, and an edge spacing of a passband is at least 0.4 nm. Therefore, a spacing of each reflection wavelength is at least 2 nm, and 64 nm is required. It is defined in a standard that a monitoring band can only be used above 1625 nm, and a wavelength range of an optical time domain reflectometer (OTDR) is 1650 nm+/−5 nm. This means that a wavelength range of the tunable laser can only be from 1625 nm to 1645 nm. However, a wavelength range from 1625 nm to 1689 nm is required based on the foregoing analysis.

In other words, due to a limitation of a monitoring wavelength range, in some cases, no sufficient wavelengths can be allocated to the optical splitter to distinguish different branch ports of the optical splitter. Consequently, the connection relationship between an ONU and a branch port of the optical splitter cannot be accurately determined.

To resolve the foregoing problem, an embodiment of this application provides a port detection method and apparatus. In this application, a branch port of at least one optical splitter in the ODN may be provided with a reflection point, and the reflection point is configured to reflect optical signals of a plurality of wavelengths. Because the reflection point at the branch port of the optical splitter can reflect the optical signals of a plurality of wavelengths, different branch ports of the optical splitter can be distinguished by using different wavelength combinations. In this way, a large quantity of branch ports of the optical splitter can be defined by using free combinations of a small quantity of wavelengths. Further, the OLT or the ONU can determine, by analyzing an optical power of an optical signal received by the ONU, a reflection wavelength of a branch port of an optical splitter corresponding to the ONU. Then, a correspondence between an ONU and a branch port of an optical splitter at each level is determined based on a correspondence between a reflection wavelength and a branch port of the optical splitter.

An optical splitter provided in an embodiment of this application is first described.

In some embodiments, the optical splitter may include N first branch ports. Each of the N first branch ports is provided with a reflection point. A reflection point of each first branch port is configured to reflect optical signals of a plurality of wavelengths. In addition, at least one optical signal in optical signals reflected by reflection points of any two of the first branch ports has a different wavelength, where N is an integer greater than 0.

In this way, N different first branch ports of the optical splitter can be distinguished by using different wavelength combinations.

For example, the first branch port is configured to reflect optical signals of two wavelengths.

For example, as shown in Table 1, the optical splitter includes branch ports 7 to 16, the branch ports 7 to 16 are all first branch ports, and the branch ports 7 to 16 are separately distinguished by using a combination of any two wavelengths in λ3 to λ8. A wavelength corresponding to a branch port is a wavelength used by the branch port for reflection. For example, the branch port 7 corresponds to λ3λ4, which means that the branch port 7 is configured to reflect optical signals whose wavelengths are λ3 and λ4. In this way, a total of 10 branch ports of the branch ports 7 to 16 can be distinguished by using optical signals of six wavelengths λ3 to λ8.

TABLE 1

| Port | 1 | 2 | 3 | 4 | 5 | 6 | 7 | 8 |
|------|---|---|---|---|---|---|---|---|
| Code | $\lambda_3$ | $\lambda_4$ | $\lambda_5$ | $\lambda_6$ | $\lambda_7$ | $\lambda_8$ | $\lambda_3\lambda_4$ | $\lambda_3\lambda_5$ |
| Port | 9 | 10 | 11 | 12 | 13 | 14 | 15 | 16 |
| Code | $\lambda_3\lambda_6$ | $\lambda_3\lambda_7$ | $\lambda_3\lambda_8$ | $\lambda_4\lambda_5$ | $\lambda_4\lambda_6$ | $\lambda_4\lambda_7$ | $\lambda_4\lambda_8$ | $\lambda_5\lambda_6$ |

In another example, as shown in Table 2, the optical splitter includes branch ports 9 to 32, the branch ports 9 to 32 are all first branch ports, and the branch ports 9 to 32 are separately distinguished by using a combination of any two wavelengths in λ1 to λ8. A wavelength corresponding to a branch port is a wavelength used by the branch port for reflection. For example, the branch port 9 corresponds to λ1λ2, which means that the branch port 9 is configured to reflect optical signals whose wavelengths are λ1 and λ2. In this way, a total of 24 branch ports of the branch ports 9 to 32 can be distinguished by using optical signals of eight wavelengths λ1 to λ8.

TABLE 2

| Port | 1 | 2 | 3 | 4 | 5 | 6 | 7 | 8 |
|------|---|---|---|---|---|---|---|---|
| Code | $\lambda_1$ | $\lambda_2$ | $\lambda_3$ | $\lambda_4$ | $\lambda_5$ | $\lambda_6$ | $\lambda_7$ | $\lambda_8$ |
| Port | 9 | 10 | 11 | 12 | 13 | 14 | 15 | 16 |
| Code | $\lambda_1\lambda_2$ | $\lambda_1\lambda_3$ | $\lambda_1\lambda_4$ | $\lambda_1\lambda_5$ | $\lambda_1\lambda_6$ | $\lambda_1\lambda_7$ | $\lambda_1\lambda_8$ | $\lambda_2\lambda_3$ |
| Port | 17 | 18 | 19 | 20 | 21 | 22 | 23 | 24 |
| Code | $\lambda_2\lambda_4$ | $\lambda_2\lambda_5$ | $\lambda_2\lambda_6$ | $\lambda_2\lambda_7$ | $\lambda_2\lambda_8$ | $\lambda_3\lambda_4$ | $\lambda_3\lambda_5$ | $\lambda_3\lambda_6$ |
| Port | 25 | 26 | 27 | 28 | 29 | 30 | 31 | 32 |
| Code | $\lambda_3\lambda_7$ | $\lambda_3\lambda_8$ | $\lambda_4\lambda_5$ | $\lambda_4\lambda_6$ | $\lambda_4\lambda_7$ | $\lambda_4\lambda_8$ | $\lambda_5\lambda_6$ | $\lambda_5\lambda_7$ |

For example, the first branch port is configured to transmit optical signals of two wavelengths.

For example, as shown in Table 1, the optical splitter includes branch ports 7 to 16, the branch ports 7 to 16 are all first branch ports, and the branch ports 7 to 16 are separately distinguished by using a combination of any two wavelengths in λ3 to λ8. A wavelength corresponding to a branch port is a wavelength used by the branch port for transmission. For example, the branch port 7 corresponds to λ3λ4, which means that the branch port 7 is configured to transmit optical signals whose wavelengths are λ3 and λ4. In this way, a total of 10 branch ports of the branch ports 7 to 16 can be distinguished by using optical signals of six wavelengths λ3 to λ8.

In another example, as shown in Table 2, the optical splitter includes branch ports 9 to 32, the branch ports 9 to 32 are all first branch ports, and the branch ports 9 to 32 are separately distinguished by using a combination of any two wavelengths in λ1 to λ8. A wavelength corresponding to a branch port is a wavelength used by the branch port for transmission. For example, the branch port 9 corresponds to λ1λ2, which means that the branch port 9 is configured to transmit optical signals whose wavelengths are λ1 and λ2. In this way, a total of 24 branch ports of the branch ports 9 to 32 can be distinguished by using optical signals of eight wavelengths λ1 to λ8.

Optionally, the first branch port may reflect optical signals of a plurality of wavelengths by using one reflection point.

Optionally, the first branch port may reflect optical signals of a plurality of wavelengths by using a plurality of reflection points.

In some other embodiments, the optical splitter may further include K second branch ports. Each of the K second branch ports is provided with a reflection point. The reflection point of each second branch port is configured to reflect an optical signal of one wavelength, wavelengths of optical signals reflected by reflection points of any two of the second branch ports are different, where K is an integer greater than 0.

For example, as shown in Table 1, branch ports 1 to 6 are included. In this way, a total of 16 branch ports of the branch ports 1 to 16 can be distinguished by using the optical signals of six wavelengths λ3 to λ8.

In another example, as shown in Table 2, branch ports 1 to 8 are included. In this way, a total of 32 branch ports of the branch ports 1 to 32 can be distinguished by using the optical signals of eight wavelengths λ1 to λ8.

In some other embodiments, the optical splitter may further include a third branch port, and the third branch port is provided with no reflection point.

In other words, the optical splitter may include a branch port that does not reflect an optical signal of any wavelength.

In some possible implementations, the foregoing reflection point may be formed by etching a grating on the branch port of the optical splitter and/or plating a film on an end face of the branch port.

It should be noted that, Table 1 and Table 2 are merely examples, and do not constitute a limitation on embodiments of this application. For example, the first branch port may be further configured to reflect optical signals of another quantity of wavelengths. In another example, there may be another correspondence between each branch port and a wavelength.

In this application, a correspondence between each branch port of the optical splitter and a wavelength may be preconfigured in the OLT or the ONU, so that the OLT or the ONU determines, based on the correspondence, a correspondence between an ONU and a branch port of an optical splitter at each level. For example, the OLT or the ONU may store a correspondence table in a form shown in Table 1 and Table 2.

The following describes a port detection method in an embodiment of this application. In the port detection method in this embodiment of this application, an OLT may perform port detection, or an ONU may perform port detection.

The following first describes a port detection method performed by the OLT.

Figure 4:
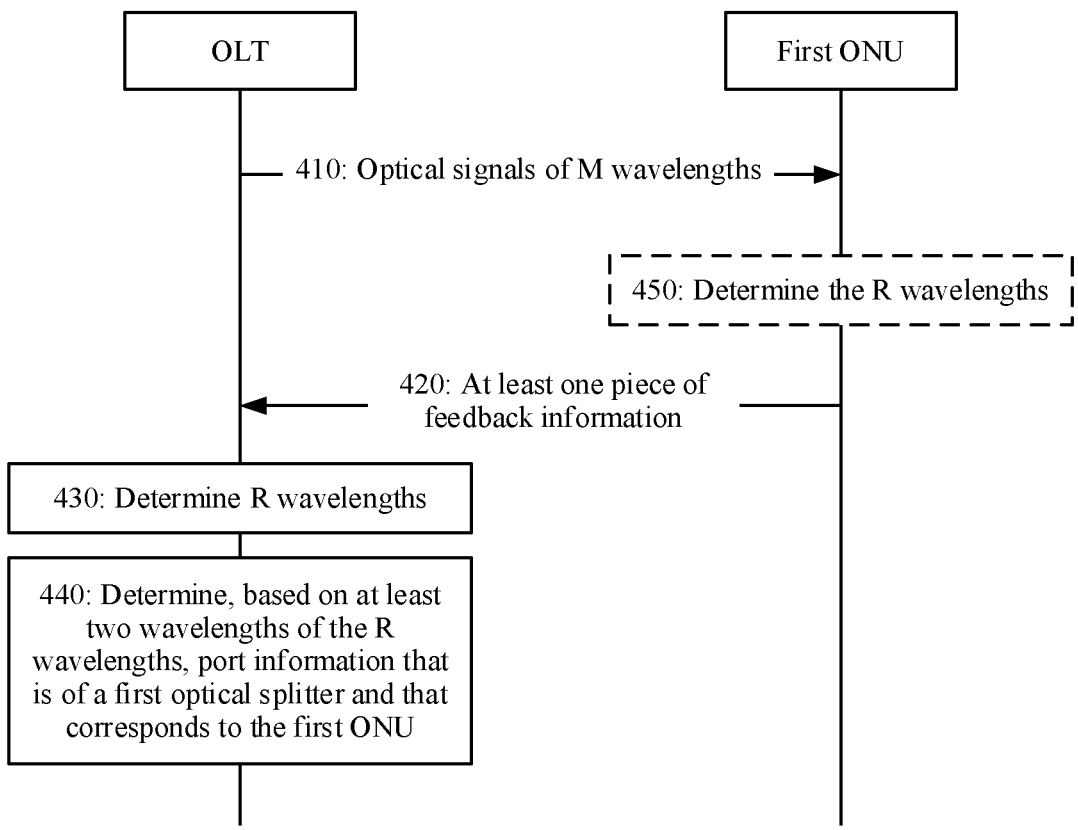
FIG. 4 is a schematic flowchart of a port detection method according to an embodiment of this application.

FIG. 4 is a schematic flowchart of a port detection method according to an embodiment of this application. The method shown in FIG. 4 is applicable to a PON system. An ODN in the PON system includes at least one optical splitter, where a first branch port of a first optical splitter in the at least one optical splitter is configured to reflect or transmit optical signals of at least two different wavelengths.

In step 410, an OLT sends optical signals of M wavelengths to at least one ONU, where the M wavelengths are different from each other.

Accordingly, the at least one ONU receives the optical signals of M wavelengths.

The at least one ONU is an ONU that accesses the PON system.

For ease of description, the following uses a first ONU in the at least one ONU as an example to describe this embodiment of this application. It should be understood that, the first ONU may be any ONU in the at least one ONU that accesses the PON system.

Usually, the M wavelengths for performing port detection are different from a wavelength band for performing data transmission between the OLT and the ONU. In the following description, the optical signals of M wavelengths for performing port detection may be referred to as monitoring light, and an optical signal for performing data transmission between the OLT and the ONU may be referred to as service light. The monitoring light and the service light may be transmitted by using different lasers. In the following description, a laser that transmits the monitoring light is referred to as a monitoring laser, and a laser that transmits the service light is referred to as a service laser. In some embodiments, multiplexing processing may be performed on the monitoring light and the service light by using a wavelength division multiplex (WDM) multiplexer. Specifically, only the service light passes through an optical fiber between the service laser and the WDM multiplexer, and only the monitoring light passes through an optical fiber between the monitoring laser and the WDM. The service light and the monitoring light are combined into one feed fiber through the WDM. The service laser and the monitoring laser can interact with the ONU through scheduling performed by a management system (for example, a network cloud engine (NCE) system).

A manner in which the OLT sends the optical signals of M wavelengths is not specifically limited in this embodiment of this application. For example, the OLT may sequentially broadcast the optical signals of M wavelengths by using the monitoring laser. In another example, the OLT may simultaneously broadcast the optical signals of M wavelengths by using the monitoring laser.

The monitoring laser in this embodiment of this application may be a tunable laser, and can emit optical signals of different wavelengths, or may alternatively include a plurality of lasers emitting different wavelengths. Optionally, the monitoring laser may be integrated into the OLT, so that the OLT can directly control the monitoring laser to send an optical signal. Optionally, the monitoring laser may be disposed independently of the OLT. The OLT may directly send a control signal to the monitoring laser, or send a control signal to the management system, and the management system (for example, the NCE system) controls the monitoring laser to emit an optical signal. It should be understood that, a specific arrangement manner of the monitoring laser may be adjusted based on an actual application scenario. This is not limited in this application.

It should be noted that, when the laser is disposed independently of the OLT, the laser may be used as a part of an OLT system. Therefore, in this embodiment of this application, it is described, in all cases, that the OLT sends the optical signals of M wavelengths to the at least one ONU.

The laser in this embodiment of this application may include a distributed Bragg reflector (DBR) laser, a directly modulated laser (DML), and the like.

In some embodiments, before the monitoring laser sends the optical signals of M wavelengths to the first ONU, the OLT or the management system needs to obtain the M wavelengths. In a possible implementation, the M wavelengths may be determined based on a specific arrangement of the optical splitter in the ODN in the PON system. For example, a quantity of wavelengths required is learned based on early planning of network construction, and after network construction is completed, determined wavelengths are input to the OLT or the management system. When the OLT or the management system needs to drive the monitoring laser to emit an optical signal for port detection, the OLT or the management system drives, based on a preconfigured wavelength, the monitoring laser to emit the optical signal.

For example, it is assumed that the ODN is a two-level optical splitting network, a first-level optical splitter is an optical splitter with a split ratio of 1:4, and a second-level optical splitter is an optical splitter with a split ratio of 1:16. For the optical splitter with a split ratio of 1:4, distinction may be implemented by using free combinations of two different wavelengths (four branch ports may respectively correspond to an optical signal of $\lambda 1$, an optical signal of $\lambda 2$, optical signals of $\lambda 1$ and $\lambda 2$, and no reflection of an optical signal). For the optical splitter with a split ratio of 1:16, distinction may be implemented by using free combinations of six different wavelengths. Therefore, eight different wavelengths are required for the ODN. The eight different wavelengths may be preconfigured in the OLT or the management system. When the OLT or the management system needs to drive the monitoring laser to emit an optical signal for port detection, the OLT or the management system determines that optical signals of the foregoing eight different wavelengths need to be sent, and drives the monitoring laser to emit the optical signals.

In some embodiments, before the OLT sends an optical signal of a first wavelength in the M wavelengths to the first ONU, the OLT may send information about the first wavelength to the first ONU, so that the first ONU determines a wavelength of a to-be-received optical signal. The first wavelength is any wavelength of the M wavelengths.

In some other embodiments, when the OLT sends the optical signal of the first wavelength in the M wavelengths to the first ONU, the optical signal of the first wavelength may be encoded, so that the optical signal of the first wavelength carries the information about the first wavelength, and the first ONU determines a wavelength of a received optical signal. The first wavelength is any wavelength of the M wavelengths. In addition, encoding the optical signal of the first wavelength further helps distinguish between the optical signal of the first wavelength and noisy light.

In step 420, the first ONU sends at least one piece of feedback information to the OLT, where the at least one piece of feedback information is used to indicate R wavelengths corresponding to the first ONU, and R is a positive integer greater than or equal to 2.

Accordingly, the OLT receives the at least one piece of feedback information from the first ONU.

Optionally, the R wavelengths corresponding to the first ONU may correspond to optical signals that are reflected by a reflection point at the branch port of the optical splitter and that are in the optical signals of M wavelengths during transmission from the OLT to the first ONU.

Optionally, the R wavelengths corresponding to the first ONU may correspond to optical signals that are not reflected by a reflection point at the branch port of the optical splitter and that are in the optical signals of M wavelengths during transmission from the OLT to the first ONU.

In some embodiments, the at least one piece of feedback information may include optical power values of the optical signals of M wavelengths. That is, the first ONU feeds back optical power values of the optical signals of M wavelengths received by the first ONU to the OLT. Optionally, the at least one piece of feedback information may include M optical power values and information about the M wavelengths, and the M optical power values are in a one-to-one correspondence with the information about the M wavelengths.

In some other embodiments, the at least one piece of feedback information includes information about the R wavelengths, and the information about the R wavelengths is information about the R wavelengths corresponding to the first ONU. Optionally, the information about the wavelengths may be identification information of the wavelengths. For example, identifiers of λ1 to λ8 are respectively 0001 to 0008.

Optionally, some optical signals that are of the optical signals of M wavelengths and that are sent by the OLT from the OLT to the first ONU are reflected in the ODN, and optical power values of the some optical signals received by the first ONU are low or are 0. Wavelengths of the some optical signals are the R wavelengths corresponding to the first ONU.

For example, two-level optical splitting is performed between the OLT and the first ONU. The first ONU accesses the PON system by using a branch port 1 of a first-level optical splitter and a branch port 1 of a second-level optical splitter. It is assumed that a reflection point of the branch port 1 of the first-level optical splitter is configured to reflect an optical signal of λ1, and a reflection point of the branch port 1 of the second-level optical splitter is configured to reflect optical signals of λ3 and λ4. In this case, the R wavelengths are λ1, λ3, and λ4.

Optionally, some optical signals that are of the optical signals of M wavelengths and that are sent by the OLT from the OLT to the first ONU are reflected in the ODN, and optical power values of the some optical signals received by the first ONU are low or are 0. Wavelengths of optical signals of the optical signals of M wavelengths other than the some optical signals are the R wavelengths corresponding to the first ONU.

For example, one-level optical splitting is performed between the OLT and the first ONU. The OLT sends an optical signal of each of wavelengths λ1 to λ8. The first ONU accesses the PON system by using a branch port 1 of the optical splitter. It is assumed that a reflection point of the branch port 1 of the optical splitter is configured to reflect the optical signals of λ1 to λ6, that is, the branch port 1 transmits the optical signals of λ7 and λ8. In this case, the R wavelengths are λ7 and λ8.

When the at least one piece of feedback information includes the information about the R wavelengths, the first ONU may perform step 450, that is, the first ONU determines the R wavelengths.

In a possible implementation, when the R wavelengths are wavelengths of optical signals reflected by a reflection point at a branch port of the optical splitter, the first ONU compares an optical power value of a received optical signal with a first preset threshold. Some optical signals that are of the optical signals of M wavelengths and that are sent by the OLT from the OLT to the first ONU are reflected by the reflection point at the branch port of the optical splitter, and optical power values of the some optical signals received by the first ONU are low or are 0. When the optical power value of the received optical signal is less than the first preset threshold, the optical signal is a reflected optical signal. Therefore, when the optical power value of the received optical signal is less than the first preset threshold, the first ONU determines that a wavelength of the optical signal is one of the wavelengths corresponding to the first ONU.

In a possible implementation, when the R wavelengths are wavelengths of optical signals transmitted by a branch port of the optical splitter, the first ONU compares an optical power value of a received optical signal with a second preset threshold. Some optical signals that are of the optical signals of M wavelengths and that are sent by the OLT from the OLT to the first ONU are reflected by the reflection point at the branch port of the optical splitter, and optical power values of the some optical signals received by the first ONU are low or are 0. When the optical power value of the received optical signal is greater than the second preset threshold, the optical signal is an optical signal that has not been reflected. Therefore, when the optical power value of the received optical signal is greater than the second preset threshold, the first ONU determines that a wavelength of the optical signal is one of the wavelengths corresponding to the first ONU.

In another possible implementation, when the R wavelengths are wavelengths of optical signals reflected by a reflection point at a branch port of the optical splitter, after receiving the optical signals of M wavelengths, the first ONU compares obtained optical powers of the M optical signals. If a difference between two of M optical power values is greater than a third preset threshold, it is determined that one smaller optical power value is one of the wavelengths corresponding to the first ONU. Comparisons are performed sequentially until the foregoing R wavelengths are determined.

In another possible implementation, when the R wavelengths are wavelengths of optical signals transmitted by a branch port of the optical splitter, after receiving the optical signals of M wavelengths, the first ONU compares obtained optical powers of the M optical signals. If a difference between two of M optical power values is greater than a third preset threshold, it is determined that one larger optical power value is one of the wavelengths corresponding to the first ONU. Comparisons are performed sequentially until the foregoing R wavelengths are determined.

In another possible implementation, when the R wavelengths are wavelengths of optical signals reflected by a reflection point at a branch port of the optical splitter, if each ONU corresponds to the R wavelengths, after receiving the optical signals of M wavelengths, the first ONU may sort obtained M optical power values in ascending order, to determine that R wavelengths corresponding to first R optical power values are the R wavelengths corresponding to the first ONU.

In another possible implementation, when the R wavelengths are wavelengths of optical signals transmitted by a branch port of the optical splitter, if each ONU corresponds to the R wavelengths, after receiving the optical signals of M wavelengths, the first ONU may sort obtained M optical power values in ascending order, to determine that R wavelengths corresponding to last R optical power values are the R wavelengths corresponding to the first ONU.

In another possible implementation, when the R wavelengths are wavelengths of optical signals reflected by a reflection point at a branch port of the optical splitter, if each ONU corresponds to the R wavelengths, after receiving the optical signals of M wavelengths, the first ONU compares obtained optical powers of the M optical signals. If a difference between M optical power values is greater than a third preset threshold, it is determined that wavelengths corresponding to R minimum optical power values of the optical power values are the foregoing R wavelengths.

In another possible implementation, when the R wavelengths are wavelengths of optical signals transmitted by a branch port of the optical splitter, if each ONU corresponds to the R wavelengths, after receiving the optical signals of M wavelengths, the first ONU compares obtained optical powers of the M optical signals. If a difference between M optical power values is greater than a third preset threshold, it is determined that wavelengths corresponding to R maximum optical power values of the optical power values are the foregoing R wavelengths.

In a possible implementation, the first ONU further sends identification information of the first ONU to the OLT, such as an identifier, a number, and a device name of the first ONU. For example, the identification information may include an identifier allocated by the OLT to the ONU, an existing identifier of the ONU, or the like.

In a possible implementation, the identification information of the first ONU may be separately sent by the first ONU to the OLT, or may be included in the at least one piece of feedback information and sent to the OLT, so that the OLT can identify, based on the identification information, that the at least one piece of feedback information is fed back by the first ONU. For example, when sending optical power information to the OLT, the first ONU may include the identification information of the first ONU in the optical power information. Alternatively, when sending port information to the OLT, the first ONU may include the identification information of the first ONU in the port information.

A manner in which the first ONU sends the at least one piece of feedback information is not specifically limited in this embodiment of this application.

In some embodiments, the first ONU sends a plurality of pieces of feedback information to the OLT, to indicate the R wavelengths corresponding to the first ONU.

For example, each of the plurality of pieces of feedback information corresponds to an optical signal of one wavelength. For example, after receiving the optical signal of one wavelength, the first ONU may feed back an optical power value of the optical signal to the OLT. When the at least one piece of feedback information includes the optical power values of the optical signals of M wavelengths, the first ONU sends M pieces of feedback information to the OLT. In another example, when the at least one piece of feedback information includes information about or optical power values of the R wavelengths, the first ONU may send R pieces of feedback information to the OLT.

In another example, each of the plurality of pieces of feedback information corresponds to optical signals of a plurality of wavelengths. For example, each piece of feedback information corresponds to optical signals of two wavelengths. After receiving the optical signals of two wavelengths, the first ONU may feed back optical power values of the two optical signals to the OLT. When the at least one piece of feedback information includes the optical power values of the optical signals of M wavelengths, the first ONU sends M/2 pieces of feedback information to the OLT. When the at least one piece of feedback information includes information about or optical power values of the R wavelengths, the first ONU may send R/2 pieces of feedback information to the OLT.

In some other embodiments, the first ONU may alternatively send one piece of feedback information to the OLT, to indicate the R wavelengths corresponding to the first ONU. For example, after receiving the optical signals of M wavelengths, the first ONU feeds back the optical power values of the optical signals of M wavelengths to the OLT by using the piece of feedback information. In another example, after receiving the optical signals of M wavelengths and after determining the R wavelengths corresponding to the first ONU, the first ONU feeds back, to the OLT by using the piece of feedback information, information about the R wavelengths corresponding to the first ONU.

In step 430, the OLT determines, based on the at least one piece of feedback information, the R wavelengths corresponding to the first ONU.

In some embodiments, when the at least one piece of feedback information may include the optical power values of the optical signals of M wavelengths, the OLT determines the R wavelengths. A specific implementation is the same as or similar to a determining manner of the first ONU. Reference may be made to related descriptions in step 450, and details are not described herein again.

In some other embodiments, when the at least one piece of feedback information includes the information about the R wavelengths, the OLT may directly determine, based on the information about the R wavelengths, the R wavelengths corresponding to the first ONU.

In step 440, the OLT determines, based on at least two wavelengths of the R wavelengths, port information that is of the first optical splitter and that corresponds to the first ONU.

In some embodiments, the OLT can determine, based on the at least two wavelengths of the R wavelengths and a preset correspondence, the port information that is of the first optical splitter and that corresponds to the first ONU. The correspondence may be a correspondence between a wavelength and a branch port of the optical splitter. The correspondence includes a correspondence between the at least two wavelengths and a first branch port of the first optical splitter. In this way, the OLT can determine, based on the correspondence between the at least two wavelengths and a first branch port of the first optical splitter, that the first ONU corresponds to the first branch port of the first optical splitter.

For example, the first optical splitter is an optical splitter with a split ratio of 1:16, and 16 branch ports of the first optical splitter are distinguished by using λ3 to λ8. The correspondence between a wavelength and a branch port shown in Table 1 is preconfigured in the OLT. For example, the first branch port is a branch port 7, and the at least two wavelengths are λ3 and λ4. When the OLT determines that the R wavelengths include λ3 and λ4, the OLT can determine, based on λ3 and λ4, that the first ONU corresponds to the branch port 7, that is, the branch port 7 of the first optical splitter is directly or indirectly connected to the first ONU.

In the foregoing technical solutions, the branch port of the optical splitter reflects or transmits at least two different wavelengths. The OLT determines one branch port by using the at least two different wavelengths. In this way, a large quantity of branch ports of the optical splitter can be defined by using free combinations of a small quantity of wavelengths, and a connection relationship between an ONU and a branch port of the optical splitter can be accurately determined.

With reference to specific examples, the following describes in detail the port detection method shown in FIG. 4.

Example 1

The ODN is a two-level optical splitting network, and an encoding manner is a hybrid manner of one-level encoding and two-level encoding. An X-level encoding may be understood as that a branch port of the optical splitter is separately configured to reflect or transmit optical signals of X different wavelengths. For example, branch ports of an optical splitter using one-level encoding are separately configured to reflect or transmit an optical signal of one wavelength, and different branch ports are distinguished by using different wavelengths. Branch ports of an optical splitter using two-level encoding are separately configured to reflect or transmit optical signals of two wavelengths, and different branch ports are distinguished by using pairwise combinations of different wavelengths. Some branch ports of an optical splitter using the hybrid manner of one-level encoding and two-level encoding are configured to reflect or transmit an optical signal of one wavelength, and some branch ports are configured to reflect or transmit optical signals of two wavelengths. In this example, that the optical splitter reflects monitoring light is used as an example.

Figure 5:
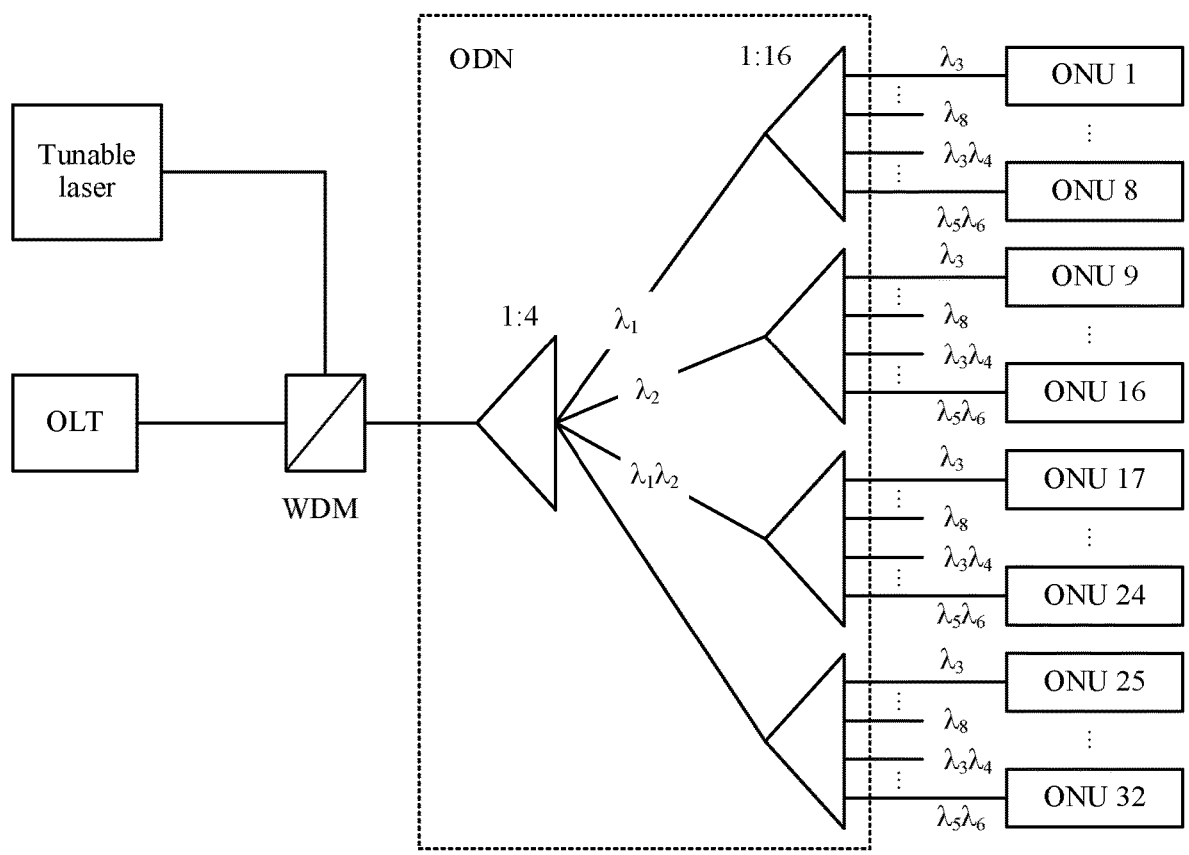
FIG. 5 shows an example of a PON system according to an embodiment of this application.

As shown in FIG. 5, the OLT and the ONU interactively communicate with each other and use an operating wavelength (for example, 1260 nm to 1625 nm) and a monitoring wavelength (for example, 1625 nm to 1645 nm). Only the operating wavelength passes through an optical fiber between the OLT and the WDM, and only the monitoring wavelength passes through an optical fiber between the tunable laser and the WDM. The operating wavelength and the monitoring wavelength are combined into one feed fiber through a WDM multiplexer.

A first-level optical splitter is an optical splitter with a split ratio of 1:4. The optical splitter is obtained by improving a common optical splitter, that is, by etching a grating on each branch port of the optical splitter or plating a film on an end face of the branch port. A formed grating or reflective film transmits an optical signal of an operating wavelength, reflects an optical signal of a specific monitoring wavelength, and transmits an optical signal of another monitoring wavelength. For example, four branch ports of the first-level optical splitter are branch ports 1 to 4 in order from top to bottom. The branch port 1 is configured to reflect only an optical signal of a wavelength $\lambda 1$, the branch port 2 is configured to reflect only an optical signal of a wavelength $\lambda 2$, the branch port 3 is configured to reflect only optical signals of wavelengths $\lambda 1$ and $\lambda 2$, and the branch port 4 does not reflect an optical signal of any wavelength. For the optical signal of an operating wavelength, the optical splitter has only a characteristic of equally dividing an optical power. For the optical signal of a monitoring wavelength, the optical splitter has not only the characteristic of equally dividing an optical power, but also needs to reflect optical signals of zero, one, or two monitoring wavelengths at each branch port. In this way, the branch ports 1 to 4 can be defined by using only two different wavelengths. A correspondence between a branch port of the first-level optical splitter and a wavelength may be shown in Table 3.

TABLE 3

| Port | 1 | 2 | 3 | 4 |
|------|---|---|---|---|
| Code | $\lambda_1$ | $\lambda_2$ | $\lambda_1 \lambda_2$ | |

A second-level optical splitter is an optical splitter with a split ratio of 1:16. Similarly, for the optical signal of an operating wavelength, the optical splitter has only an optical splitter characteristic. For the optical signal of a monitoring wavelength, the optical splitter has not only the characteristic of equally dividing an optical power, but also needs to reflect optical signals of zero, one, or two monitoring wavelengths at each branch port. The hybrid manner of one-level encoding and two-level encoding is used as an example. In the hybrid manner of one-level encoding and two-level encoding, 6+5+4+3+2+1=21 types of encoding can be implemented by using six different wavelengths, so that 16 branch ports can be completely distinguished. The six different wavelengths are $\lambda 3$ to $\lambda 8$, and a correspondence between a branch port of the second-level optical splitter and a wavelength may be shown in Table 1.

In this way, in this example, only eight different wavelengths are required, where $\lambda 1$ and $\lambda 2$ are used to define the branch ports of the first-level optical splitter, and $\lambda 3$ to $\lambda 8$ are used to define the branch ports of the second-level optical splitter.

The following describes a port detection procedure of the ONU and a branch port of the optical splitter.

Figure 6A:
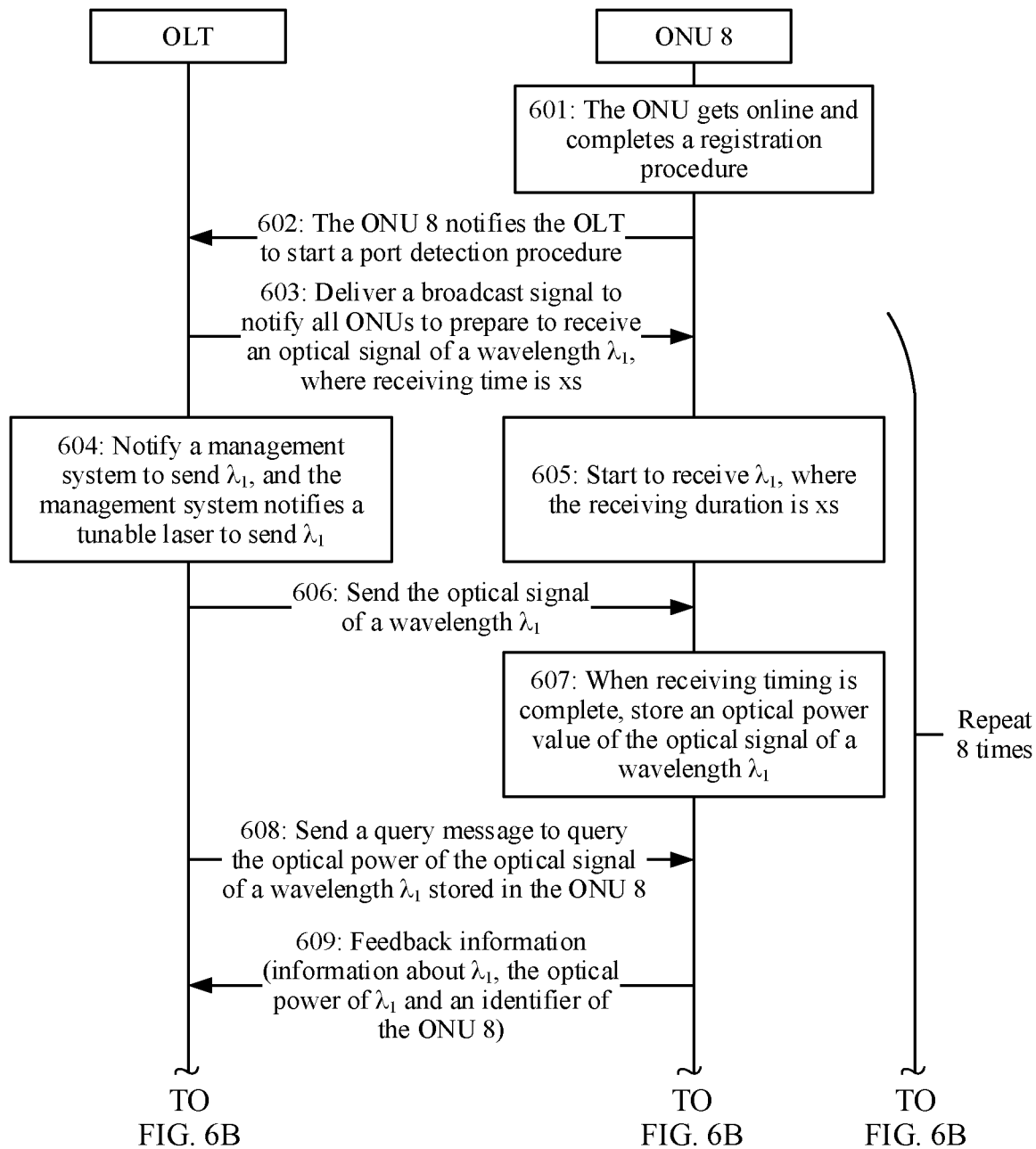
FIG. 6A and FIG. 6B show an example of a port detection procedure according to an embodiment of this application.
Figure 6B:
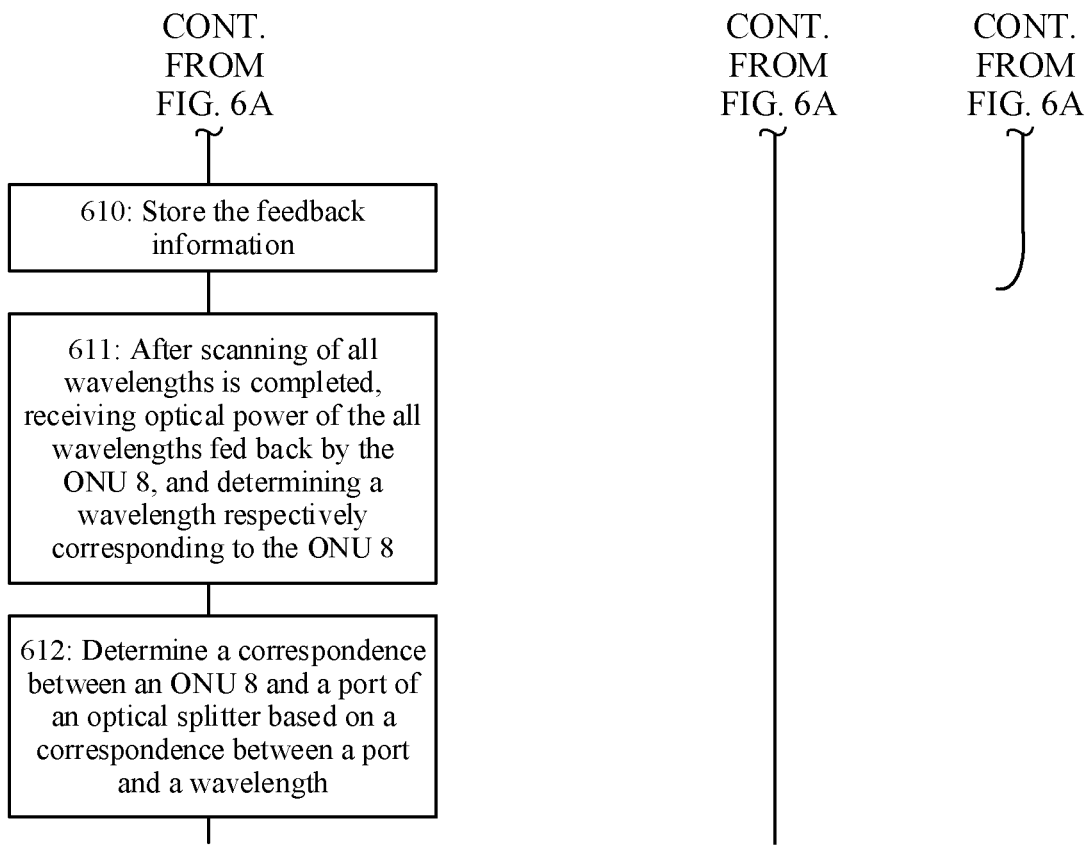

FIG. 6A and FIG. 6B show an example of a port detection procedure according to an embodiment of this application. In FIG. 6A and FIG. 6B, an OLT determines a correspondence between an ONU and a port of an optical splitter. After each ONU gets online and completes a registration procedure, a port detection procedure of each ONU and a branch port of the optical splitter is started. An ONU 8 is used as an example for description. A specific procedure is as follows:

In step 601, the ONU 8 gets online and completes a registration procedure.

In step 602, the ONU 8 notifies the OLT to start the port detection procedure.

In step 603, after receiving notification information of the ONU 8, the OLT delivers a broadcast signal of an operating wavelength, to notify all ONUs to prepare to receive an optical signal of a wavelength $\lambda 1$, where receiving duration is x seconds (s).

In step 604, the OLT notifies a management system (for example, an NCE) to send the optical signal of a wavelength $\lambda 1$, and the management system drives a tunable laser to send the optical signal of a wavelength $\lambda 1$.

In step 605, the ONU 8 prepares to receive the optical signal of a wavelength $\lambda 1$, where the receiving duration is xs.

In step 606, based on wavelength information input when an ODN is planned in an early stage of network construction, the management system determines that optical signals of eight different wavelengths $\lambda 1$ to $\lambda 8$ in total need to be sent, and delivers a command to the tunable laser to drive the tunable laser to send the optical signal of a wavelength $\lambda 1$.

Optionally, the optical signal of a wavelength $\lambda 1$ may carry encoding information, to distinguish a noisy optical signal.

In step 607, within the receiving duration (for example, 1 s), the ONU 8 receives the optical signal of a wavelength $\lambda 1$, and the ONU 8 stores an optical power value of the optical signal of a wavelength $\lambda 1$.

Because the ONU 8 is indirectly connected to a branch port 1 of a first-level optical splitter, the optical signal of a wavelength $\lambda 1$ is reflected, and the optical power value of the optical signal received by the ONU 8 is small or is 0.

In step 608, the OLT sends a query message to an ONU 8 to query the optical power of the optical signal of a wavelength $\lambda 1$ stored in the ONU 8.

In step 609, the ONU 8 sends feedback information to the OLT to feed back the optical power of the optical signal of a wavelength $\lambda 1$ received by the ONU 8. Optionally, the feedback information includes the optical power of the optical signal of λ1, information about the optical signal of λ1, and an identifier of the ONU 8.

In step 610, after receiving the feedback information, the OLT stores the feedback information, and scanning of the wavelength λ1 is completed.

Step 603 to step 610 are repeatedly performed until the OLT completes scanning of λ1 to λ8 to obtain corresponding optical power values and ONU identifiers.

In some embodiments, the OLT may alternatively send a query message to the ONU 8 after scanning of all wavelengths is completed, to query optical powers of optical signals of all or some wavelengths received by the ONU 8. The ONU 8 feeds back, by using feedback information, the received optical powers of optical signals of all or some wavelengths.

In step 611, after scanning of all wavelengths is completed, the OLT learns, through analysis, that the ONU 8 cannot receive optical signals of wavelengths λ1, λ5, and λ6, and can receive optical signals of other monitoring wavelengths.

Optionally, the OLT may generate a netlist of an optical power value and an ONU identifier based on the obtained optical power value of each wavelength and the ONU identifier. For example, the netlist of an optical power value and an ONU identifier may be shown in Table 4. N indicates "not received", and Y indicates "received".

TABLE 4

|  | $\lambda_1$ | $\lambda_2$ | $\lambda_3$ | $\lambda_4$ | $\lambda_5$ | $\lambda_6$ | $\lambda_7$ | $\lambda_8$ |
| --- | --- | --- | --- | --- | --- | --- | --- | --- |
| ONU 1 | N | Y | N | Y | Y | Y | Y | Y |
| ONU 2 | N | Y | Y | N | Y | Y | Y | Y |
| ONU 3 | N | Y | Y | Y | N | Y | Y | Y |
| ONU 4 | N | Y | Y | Y | Y | N | Y | Y |
| ... | | | | | | | | |
| ONU 31 | Y | Y | Y | N | Y | Y | Y | N |
| ONU 32 | Y | Y | Y | Y | N | N | Y | Y |

In step 612, the OLT invokes a table (Table 1 and Table 3) of a preconfigured correspondence between a branch port of an optical splitter and a wavelength. It can be learned that λ1 corresponds to the branch port 1 of the first-level optical splitter, and λ5 and λ6 correspond to a branch port 8 of a second-level optical splitter. Therefore, a correspondence between the ONU 8 and a branch port of an optical splitter at each level is automatically established.

Other ONUs are similar to the ONU 8, and are not described one by one herein again.

Example 2

The ODN is a one-level optical splitting network, an encoding manner is a hybrid manner of one-level encoding and two-level encoding, and the optical splitter transmits monitoring light.

Figure 7:
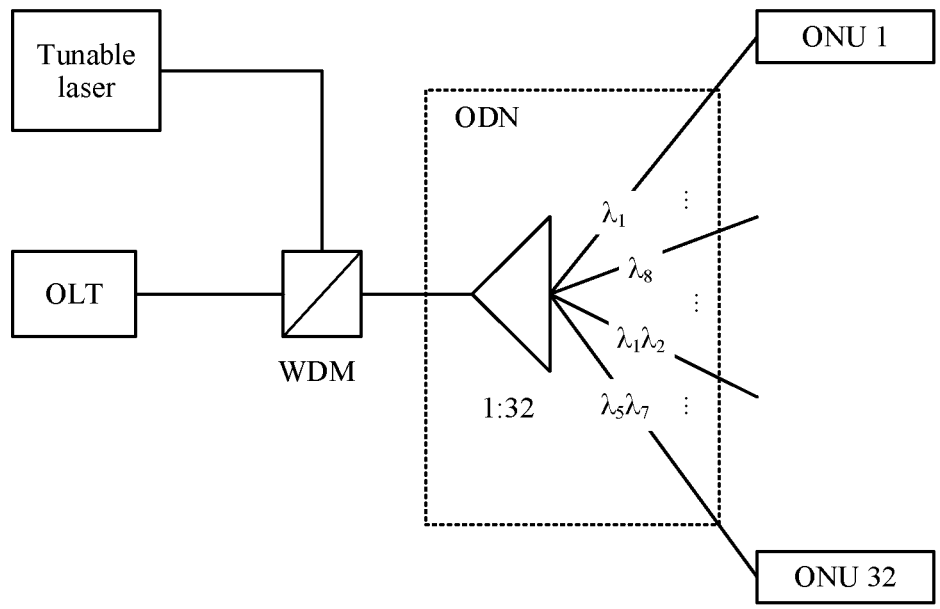
FIG. 7 shows another example of a PON system according to an embodiment of this application.

As shown in FIG. 7, the OLT and the ONU interactively communicate with each other and use an operating wavelength (for example, 1260 nm to 1625 nm) and a monitoring wavelength (for example, 1625 nm to 1645 nm). Only the operating wavelength passes through an optical fiber between the OLT and the WDM, and only the monitoring wavelength passes through an optical fiber between the tunable laser and the WDM. The operating wavelength and the monitoring wavelength are combined into one feed fiber through a WDM multiplexer.

A first-level optical splitter is an optical splitter with a split ratio of 1:32. The optical splitter is obtained by improving a common optical splitter, that is, by etching a grating on each branch port of the optical splitter or plating a film on an end face of the branch port. A formed grating or reflective film transmits an optical signal of an operating wavelength, transmits an optical signal of a specific monitoring wavelength, and reflects an optical signal of another monitoring wavelength. For the optical signal of an operating wavelength, the optical splitter has only a characteristic of equally dividing an optical power. For the optical signal of a monitoring wavelength, the optical splitter has not only the characteristic of equally dividing an optical power, but also needs to reflect optical signals of some monitoring wavelengths at each branch port. The hybrid manner of one-level encoding and two-level encoding is used as an example. In the hybrid manner of one-level encoding and two-level encoding, 8+7+6+5+4+3+2+1=36 types of encoding can be implemented by using eight different wavelengths, so that 32 branch ports can be completely distinguished. The eight different wavelengths are λ1 to λ8, the 32 branch ports of the first-level optical splitter are branch ports 1 to 32 in order from top to bottom, and a correspondence between a branch port of the first-level optical splitter and a wavelength may be shown in Table 2. The correspondence between a branch port and a wavelength shown in Table 2 may be a correspondence between a branch port and a wavelength used by the branch port for reflection, or may be a correspondence between a branch port and a wavelength used by the branch port for transmission.

In this way, in this example, only eight different wavelengths are required.

A port detection procedure in this example is similar to that in Example 1, and reference may be made to related descriptions in steps 601 to 612.

An ONU 9 is used as an example. A difference from the foregoing description is that after scanning of all wavelengths is completed, the OLT learns, through analysis, that the ONU 9 receives only optical signals of wavelengths λ1 and λ2 but does not receive an optical signal of another monitoring wavelength, or the ONU 9 receives optical signals of wavelengths λ3 to λ8 but does not receive optical signals of wavelengths λ1 and λ2. The OLT invokes a table (Table 2) of a preconfigured correspondence between a branch port of an optical splitter and a wavelength. It can be learned that λ1 and λ2 correspond to a branch port 9 of the first-level optical splitter. Therefore, a correspondence between the ONU 9 and a branch port of an optical splitter at each level is automatically established. Other ONUs are similar to the ONU 9, and are not described one by one herein again.

Optionally, the OLT may generate a netlist of an optical power value and an ONU identifier based on an obtained optical power value of each wavelength and an ONU identifier. For example, the netlist of an optical power value and an ONU identifier may be shown in Table 5. N indicates "not received", and Y indicates "received".

TABLE 5

|  | $\lambda_1$ | $\lambda_2$ | $\lambda_3$ | $\lambda_4$ | $\lambda_5$ | $\lambda_6$ | $\lambda_7$ | $\lambda_8$ |
| --- | --- | --- | --- | --- | --- | --- | --- | --- |
| ONU 1 | Y | N | N | N | N | N | N | N |
| ONU 2 | N | Y | N | N | N | N | N | N |
| ONU 3 | N | N | Y | N | N | N | N | N |
| ONU 4 | N | N | N | Y | N | N | N | N |
| ONU 9 | Y | Y | N | N | N | N | N | N |
| ... | | | | | | | | |
| ONU 31 | N | N | N | N | Y | Y | N | N |
| ONU 32 | N | N | N | N | Y | N | Y | N |

In the port detection method shown in FIG. 4 to FIG. 7, the OLT performs port detection. The following describes a port detection method performed by an ONU.

Figure 8:
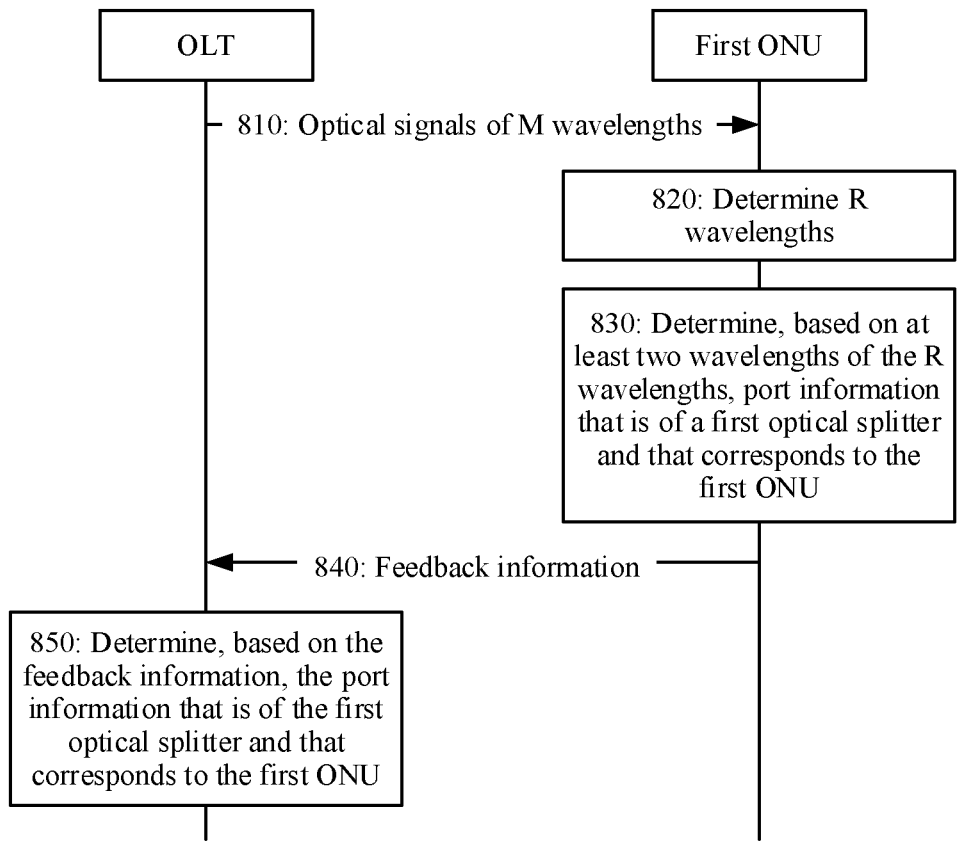
FIG. 8 is a schematic flowchart of a port detection method according to another embodiment of this application.

FIG. 8 is a schematic flowchart of a port detection method according to another embodiment of this application. The method shown in FIG. 8 is applicable to a PON system. An ODN in the PON system includes at least one optical splitter, where a first branch port of a first optical splitter in the at least one optical splitter is configured to reflect or transmit optical signals of at least two different wavelengths.

In step 810, an OLT sends optical signals of M wavelengths to at least one ONU, where the M wavelengths are different from each other.

In step 820, a first ONU determines R wavelengths based on received optical power values of the optical signals of M wavelengths, where R is an integer greater than or equal to 2.

In step 830, the first ONU determines, based on at least two wavelengths of the R wavelengths, port information that is of a first optical splitter and that corresponds to the first ONU.

In step 840, the first ONU sends feedback information to the OLT, where the feedback information is used to indicate the port information that is of the first optical splitter and that corresponds to the first ONU.

In step 850, the OLT determines, based on the received feedback information, the port information that is of the first optical splitter and that corresponds to the first ONU.

Port detection performed by the ONU is similar to port detection performed by the OLT. A difference lies in that the ONU determines, based on the at least two wavelengths of the R wavelengths, the port information that is of the first optical splitter and that corresponds to the first ONU, and feeds back the port information to the OLT by using the feedback information. The OLT does not need to analyze an optical power of an optical signal of a wavelength received by the ONU. Specifically, step 810 is similar to step 410, and reference may be made to related descriptions in step 410. A manner in which the first ONU determines the R wavelengths is similar to that in step 450, and reference may be made to related descriptions in step 450. Step 840 is similar to step 440, and reference may be made to related descriptions in step 440.

With reference to specific examples, the following describes in detail the port detection method shown in FIG. 8.

Example 3

Similarly, the PON system shown in FIG. 5 is used as an example. For a specific structure of an ODN, reference may be made to related descriptions in FIG. 5. Details are not described herein again.

Figure 9:
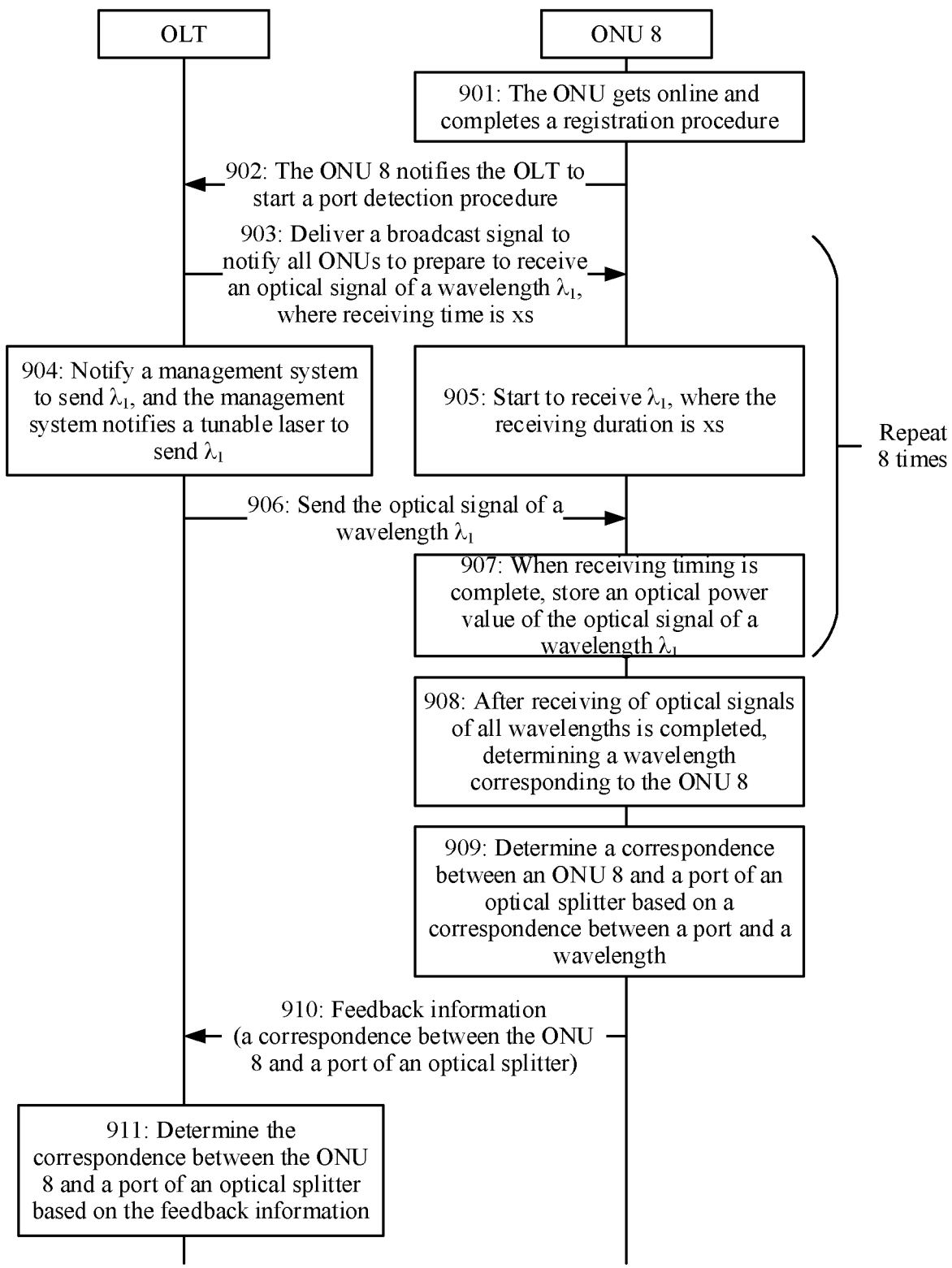
FIG. 9 shows another example of a port detection procedure according to an embodiment of this application.

FIG. 9 shows another example of a port detection procedure according to an embodiment of this application. In FIG. 9, an ONU determines a correspondence between an ONU and a port of an optical splitter. After each ONU gets online and completes a registration procedure, a port detection procedure of each ONU and a branch port of the optical splitter is started. An ONU 8 is used as an example for description. A specific procedure is as follows:

In step 901, the ONU 8 gets online and completes a registration procedure.

In step 902, the ONU 8 notifies an OLT to start the port detection procedure.

In step 903, after receiving notification information of the ONU 8, the OLT delivers a broadcast signal of an operating wavelength, to notify all ONUs to prepare to receive an optical signal of a wavelength $\lambda 1$, where receiving duration is xs.

In step 904, the OLT notifies a management system (for example, an NCE) to send the optical signal of a wavelength $\lambda 1$, and the management system drives a tunable laser to send the optical signal of a wavelength $\lambda 1$.

In step 905, the ONU 8 prepares to receive the optical signal of a wavelength $\lambda 1$, where the receiving duration is xs.

In step 906, based on wavelength information input when an ODN is planned in an early stage of network construction, the management system determines that optical signals of eight different wavelengths $\lambda 1$ to $\lambda 8$ in total need to be sent, and delivers a command to the tunable laser to drive the tunable laser to send the optical signal of a wavelength $\lambda 1$.

Optionally, the optical signal of a wavelength $\lambda 1$ may carry encoding information, to distinguish a noisy optical signal.

In step 907, within the receiving duration (for example, 1 s), the ONU 8 receives the optical signal of a wavelength $\lambda 1$, and the ONU 8 stores an optical power value of the optical signal of a wavelength $\lambda 1$. Because the ONU 8 is indirectly connected to a branch port 1 of a first-level optical splitter, the optical signal of a wavelength $\lambda 1$ is reflected, and the optical power value of the optical signal received by the ONU 8 is small or is 0.

Step 903 to step 907 are repeatedly performed until the OLT completes scanning of $\lambda 1$ to $\lambda 8$, so that the ONU 8 obtains corresponding optical power values and ONU identifiers.

In step 908, after receiving of optical signals of all wavelengths is completed, the ONU 8 learns, through analysis, that the ONU 8 cannot receive optical signals of wavelengths $\lambda 1$, $\lambda 5$, and $\lambda 6$, and can receive optical signals of other monitoring wavelengths.

In step 909, the ONU 8 invokes a table (Table 1 and Table 3) of a preconfigured correspondence between a branch port of an optical splitter and a wavelength. It can be learned that $\lambda 1$ corresponds to the branch port 1 of the first-level optical splitter, and $\lambda 5$ and $\lambda 6$ correspond to a branch port 8 of a second-level optical splitter. Therefore, a correspondence between the ONU 8 and a branch port of an optical splitter at each level is determined.

In step 910, the ONU 8 sends feedback information to the OLT, and feeds back, to the OLT, a correspondence that is between the ONU 8 and a branch port of an optical splitter at each level and that is determined by the ONU 8.

In step 911, the OLT determines the correspondence between the ONU 8 and a branch port of an optical splitter at each level based on the received feedback information.

Other ONUs are similar to the ONU 8, and are not described one by one herein again.

Example 4

Similarly, the PON system shown in FIG. 7 is used as an example. For a specific structure of an ODN, reference may be made to related descriptions in FIG. 7. Details are not described herein again. A port detection procedure in this example is similar to that in Example 3, and reference may be made to related descriptions in steps 901 to 911.

An ONU 9 is used as an example. A difference from the foregoing description is that after scanning of all wavelengths is completed, the ONU 9 determines, through analysis, that the ONU 9 receives only optical signals of wavelengths λ1 and λ2 but does not receive an optical signal of another monitoring wavelength, or the ONU 9 receives optical signals of wavelengths λ3 to λ8 but does not receive optical signals of wavelengths λ1 and λ2. The ONU 9 invokes a table (Table 2) of a preconfigured correspondence between a branch port of an optical splitter and a wavelength. It can be learned that λ1 and λ2 correspond to a branch port 9 of the first-level optical splitter. Therefore, a correspondence between the ONU 9 and a branch port of an optical splitter at each level is determined, and the correspondence is sent to the OLT by using feedback information. Other ONUs are similar to the ONU 9, and are not described one by one herein again.

In this application, the branch port of the optical splitter reflects or transmits at least two different wavelengths. The ONU determines one branch port by using the at least two different wavelengths. In this way, the large quantity of branch ports of the optical splitter can be defined by using the free combinations of a small quantity of wavelengths, and the connection relationship between an ONU and a branch port of the optical splitter can be accurately determined.

It should be noted that, in the foregoing embodiments, the optical signals of M wavelengths, the query message, and the feedback information may be carried by a PLOAM message, an OMCI message, or a data channel.

It should be further noted that, the foregoing embodiments may be separately implemented, or may be properly implemented together.

It may be understood that, to implement functions in the foregoing embodiments, a communication apparatus includes a hardware structure and/or a software module that perform corresponding functions. A person skilled in the art should easily be aware that, in combination with the examples described in embodiments disclosed in this application, units and algorithms steps may be implemented by hardware or a combination of hardware and computer software. Whether a function is performed by hardware or hardware driven by computer software depends on particular applications and design constraints of the technical solutions.

Figure 10:
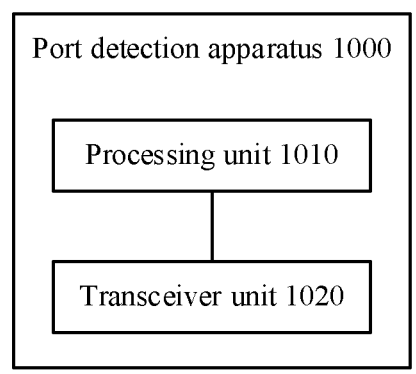
FIG. 10 is a schematic diagram of a structure of a port detection apparatus according to an embodiment of this application.
Figure 11:
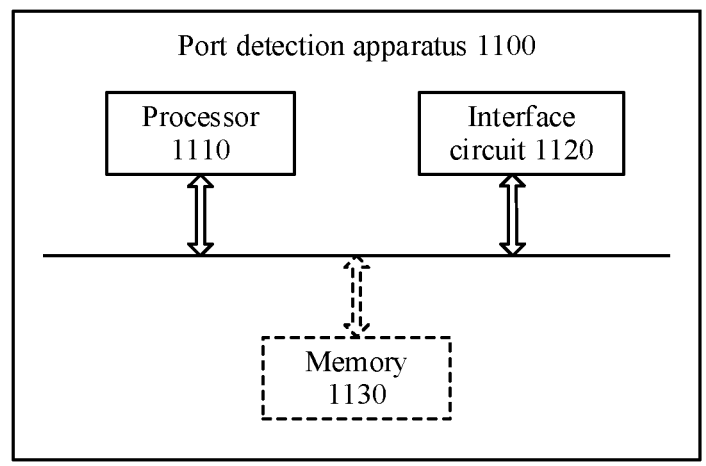
FIG. 11 is a schematic diagram of a structure of a port detection apparatus according to another embodiment of this application.

FIG. 10 and FIG. 11 are schematic diagrams of structures of port detection apparatuses according to embodiments of this application.

The apparatuses may be configured to implement functions of the OLT or the ONU in the foregoing method embodiments, and therefore can also achieve the beneficial effects in the foregoing method embodiments. In embodiments of this application, the communication apparatus may be an OLT or an ONU, or may be a module (for example, a chip) applied to the OLT or the ONU.

As shown in FIG. 10, a port detection apparatus 1000 includes a processing unit 1010 and a transceiver unit 1020. The port detection apparatus 1000 is configured to implement functions of the OLT or the ONU in the foregoing method embodiments.

When the port detection apparatus 1000 is configured to implement the function of the OLT in the method embodiment shown in FIG. 4, the following is implemented.

The transceiver unit 1020 is configured to: send optical signals of M wavelengths to at least one ONU, where the M wavelengths are different from each other, and M is an integer greater than 1; and receive at least one piece of feedback information sent by a first ONU, where the at least one piece of feedback information is used to indicate optical power values of the optical signals of M wavelengths received by the first ONU, and the first ONU is any ONU in the at least one ONU.

The processing unit 1010 is configured to: determine, based on magnitudes of the optical power values of the optical signals of M wavelengths, R wavelengths corresponding to the first ONU, where R is an integer greater than or equal to 2; and determine, based on at least two wavelengths in the R wavelengths, port information that is of a first optical splitter and that corresponds to the first ONU, where a first branch port of the first optical splitter corresponds to the at least two wavelengths.

When the port detection apparatus 1000 is configured to implement the function of the ONU in the method embodiment shown in FIG. 4, the following is implemented.

The transceiver unit 1020 is configured to: receive optical signals of M wavelengths sent by an OLT, where the M wavelengths are different from each other, and M is an integer greater than 1; and send at least one piece of feedback information to the OLT, where the at least one piece of feedback information is used to indicate optical power values of the optical signals of M wavelengths received by a first ONU.

Optionally, the processing unit 1010 is configured to determine R wavelengths based on the optical power values of the optical signals of M wavelengths received by the ONU.

When the port detection apparatus 1000 is configured to implement the function of the OLT in the method embodiment shown in FIG. 8, the following is implemented.

The transceiver unit 1020 is configured to: send optical signals of M wavelengths to at least one ONU, where the M wavelengths are different from each other, and M is an integer greater than 1; and receive feedback information sent by a first ONU, where the feedback information is used to indicate port information that is of a first optical splitter and that corresponds to the first ONU.

The processing unit 1010 is configured to determine, based on the feedback information, the port information that is of the first optical splitter and that corresponds to the first ONU.

When the port detection apparatus 1000 is configured to implement the function of the ONU in the method embodiment shown in FIG. 8, the following is implemented.

The transceiver unit 1020 is configured to receive optical signals of M wavelengths sent by an OLT, where the M wavelengths are different from each other, and M is an integer greater than 1.

The processing unit 1010 is configured to: determine, based on magnitudes of received optical power values of the optical signals of M wavelengths, R wavelengths corresponding to the ONU, where R is an integer greater than or equal to 2; and determine, based on at least two wavelengths in the R wavelengths, port information that is of a first optical splitter and that corresponds to the ONU, where a first branch port of the first optical splitter corresponds to the at least two wavelengths.

The transceiver unit 1020 is further configured to send feedback information to the OLT, where the feedback information is used to indicate the port information.

For more detailed descriptions about the processing unit 1010 and the transceiver unit 1020, reference may be directly made to related descriptions in the method embodiments. Details are not described herein again.

As shown in FIG. 11, a port detection apparatus 1100 includes a processor 1110 and an interface circuit 1120. The processor 1110 is coupled to the interface circuit 1120. It may be understood that, the interface circuit 1120 may be a transceiver or an input/output interface. Optionally, the port detection apparatus 1100 may further include a memory 1130, configured to store instructions to be executed by the processor 1110, store input data required for the processor 1110 to run the instructions, or store data generated after the processor 1110 runs the instructions.

When the port detection apparatus 1100 is configured to implement the method shown in FIG. 4 or FIG. 8, the processor 1110 is configured to perform the function of the processing unit 1010, and the interface circuit 1120 is configured to perform the function of the transceiver unit 1020.

When the port detection apparatus 1100 is a chip applied to an OLT, the chip implements the function of the OLT in the foregoing method embodiments. The chip receives information from another module in the OLT, and the information is sent by another device to a terminal device, for example, the OLT. Alternatively, the chip sends information to another module in the OLT, and the information is sent by the OLT to another device.

When the port detection apparatus 1100 is a chip applied to an ONU, the chip implements the function of the ONU in the foregoing method embodiments. The chip receives information from another module in the ONU, and the information is sent by another device to a terminal device, for example, the ONU. Alternatively, the chip sends information to another module in the ONU, and the information is sent by the ONU to another device.

It should be noted that the processor in embodiments of this application may be a central processing unit (CPU), a general-purpose processor, a digital signal processor (DSP), an application-specific integrated circuit (ASIC), a field programmable gate array (FPGA), or another programmable logical device, a transistor logical device, a hardware component, or any combination thereof. The general-purpose processor may be a microprocessor or any regular processor or the like.

The method steps in embodiments of this application may be implemented in a form of hardware, or may be implemented by a processor by executing software instructions. The software instructions may be formed by a corresponding software module. The software module may be stored in a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a removable hard disk, a CD-ROM, or a storage medium of any other form that is well known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in the OLT or the ONU. Certainly, the processor and the storage medium may exist in the OLT or the ONU as discrete components.

All or some of the foregoing embodiments may be implemented by using software, hardware, firmware, or any combination thereof. When software is used to implement the embodiments, all or some of the embodiments may be implemented in a form of a computer program product. The computer program product includes one or more computer programs or instructions. When the computer program or instructions are loaded and executed on a computer, the procedure or functions according to embodiments of this application are all or partially implemented. The computer may be a general-purpose computer, a dedicated computer, a computer network, or other programmable apparatuses. The computer program or instructions may be stored in a computer-readable storage medium, or may be transmitted by using the computer-readable storage medium. The computer-readable storage medium may be any available medium accessible by a computer, or a data storage device, for example, a server, integrating one or more available media. The available medium may be a magnetic medium, for example, a floppy disk, a hard disk, or a magnetic tape, or may be an optical medium, for example, a DVD, or may be a semiconductor medium, for example, a solid state drive (SSD).

In embodiments of this application, if there is no special description or logic conflict, terms and/or descriptions between different embodiments are consistent and may be mutually referenced, and technical features in different embodiments may be combined to form a new embodiment based on an internal logical relationship of the different embodiments.

In this application, at least one means one or more, and a plurality of means two or more. And/or describes an association relationship between associated objects, and indicates that three relationships may exist. For example, A and/or B may indicate the following cases: Only A exists, both A and B exist, and only B exists, where A and B may be singular or plural. In text descriptions of this application, a character "/" usually indicates that associated objects are in an "or" relationship. In the formula of this application, a character "/" indicates that associated objects are in a "division" relationship.

It may be understood that the various numeric numbers used in embodiments of this application are merely intended for distinguishing for ease of description, and are not intended to limit the scope of embodiments of this application. Sequence numbers of the foregoing processes do not mean execution sequences. The execution sequences of the processes should be determined according to functions and internal logic of the processes.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, wherein the method comprises:
sending, by an optical line termination (OLT), optical signals of M wavelengths to at least one optical network unit (ONU), wherein the M wavelengths are different from each other, and M is an integer greater than 1;
receiving, by the OLT, at least one piece of feedback information sent by a first ONU in the at least one ONU, wherein the at least one piece of feedback information indicates optical power values of the optical signals of the M wavelengths received by the first ONU;
determining, by the OLT, based on magnitudes of the optical power values of the optical signals of the M wavelengths, R wavelengths corresponding to the first ONU, wherein R is an integer greater than or equal to 2; and
determining, by the OLT, based on at least two wavelengths of the R wavelengths, port information of a first optical splitter corresponding to the first ONU, wherein a first branch port of the first optical splitter corresponds to the at least two wavelengths, and wherein M is less than a total number of branch ports of the first optical splitter.

2. The method according to claim 1,
wherein optical power values of optical signals corresponding to the R wavelengths are less than a first preset value, or
wherein the optical power values of the optical signals corresponding to the R wavelengths are greater than a second preset value, or
wherein the R wavelengths correspond to R minimum optical power values of the optical power values of the optical signals of the M wavelengths, or
wherein the R wavelengths correspond to R maximum optical power values of the optical power values of the optical signals of the M wavelengths, or
wherein, when there is a difference greater than a third preset threshold in differences between the optical power values of the optical signals of the M wavelengths, the R wavelengths correspond to the R minimum optical power values of the optical power values of the optical signals of the M wavelengths, or
wherein, when there is the difference greater than the third preset threshold in the differences between the optical power values of the optical signals of the M wavelengths, the R wavelengths correspond to the R maximum optical power values of the optical power values of the optical signals of the M wavelengths.

3. The method according to claim 1,
wherein the first branch port is provided with a reflection point, and
wherein the reflection point is configured to reflect optical signals of the at least two wavelengths, or the reflection point is configured to reflect an optical signal of a wavelength in the M wavelengths other than the at least two wavelengths.

4. The method according to claim 1, wherein the optical signals of the M wavelengths and the at least one piece of feedback information are carried in a physical layer operations administration and maintenance (PLOAM) message, an optical network terminal management and control interface (OMCI) message, or a data channel.

5. A method, wherein the method comprises:
receiving, by an optical network unit (ONU), optical signals of M wavelengths sent by an optical line termination (OLT), wherein the M wavelengths are different from each other, and M is an integer greater than 1;
determining, by the ONU, based on magnitudes of received optical power values of the optical signals of the M wavelengths, R wavelengths corresponding to the ONU, wherein R is an integer greater than or equal to 2;
determining, by the ONU, based on at least two wavelengths of the R wavelengths, port information of a first optical splitter corresponding to the ONU, wherein a first branch port of the first optical splitter corresponds to the at least two wavelengths; and
sending, by the ONU, feedback information to the OLT, wherein the feedback information indicates the port information, and wherein M is less than a total number of branch ports of the first optical splitter.

6. The method according to claim 5,
wherein optical power values of optical signals corresponding to the R wavelengths are less than a first preset value, or
wherein the optical power values of the optical signals corresponding to the R wavelengths are greater than a second preset value, or wherein the R wavelengths correspond to R minimum optical power values of the optical power values of the optical signals of the M wavelengths, or wherein the R wavelengths correspond to R maximum optical power values of the optical power values of the optical signals of the M wavelengths, or wherein, when there is a difference greater than a third preset threshold in differences between the optical power values of the optical signals of the M wavelengths, the R wavelengths correspond to the R minimum optical power values of the optical power values of the optical signals of the M wavelengths, or wherein, when there is the difference greater than the third preset threshold in the differences between the optical power values of the optical signals of the M wavelengths, the R wavelengths correspond to the R maximum optical power values of the optical power values of the optical signals of the M wavelengths.

7. The method according to claim 5,
wherein the first branch port is provided with a reflection point, and
wherein the reflection point is configured to reflect optical signals of the at least two wavelengths, or the reflection point is configured to reflect an optical signal of a wavelength in the M wavelengths other than the at least two wavelengths.

8. The method according to claim 5, wherein the optical signals of the M wavelengths and the feedback information are carried in a physical layer operations administration and maintenance (PLOAM) message, an optical network terminal management and control interface (OMCI) message, or a data channel.

9. A system, wherein the system comprises:
an optical line termination (OLT); and at least one optical network unit (ONU),
wherein the OLT is configured to send optical signals of M wavelengths to the at least one ONU, wherein the M wavelengths are different from each other, and M is an integer greater than 1,
wherein a first ONU in the at least one ONU is configured to send at least one piece of feedback information to the OLT, wherein the at least one piece of feedback information indicates optical power values of the optical signals of the M wavelengths received by the first ONU,
wherein the OLT is further configured to:
determine, based on magnitudes of the optical power values of the optical signals of the M wavelengths, R wavelengths corresponding to the first ONU, wherein R is a positive integer greater than or equal to 2; and
determine, based on at least two wavelengths in the R wavelengths, port information of a first optical splitter corresponding to the first ONU, wherein a first branch port of the first optical splitter corresponds to the at least two wavelengths, and wherein M is less than a total number of branch ports of the first optical splitter.

10. The system according to claim 9,
wherein optical power values of optical signals corresponding to the R wavelengths are less than a first preset value, or
wherein the optical power values of the optical signals corresponding to the R wavelengths are greater than a second preset value, or wherein the R wavelengths correspond to R minimum optical power values of the optical power values of the optical signals of the M wavelengths, or wherein the R wavelengths correspond to R maximum optical power values of the optical power values of the optical signals of the M wavelengths, or wherein, when there is a difference greater than a third preset threshold in differences between the optical power values of the optical signals of the M wavelengths, the R wavelengths correspond to the R minimum optical power values of the optical power values of the optical signals of the M wavelengths, or wherein, when there is the difference greater than the third preset threshold in the differences between the optical power values of the optical signals of the M wavelengths, the R wavelengths correspond to the R maximum optical power values of the optical power values of the optical signals of the M wavelengths.

11. The system according to claim 9,
wherein the first branch port is provided with a reflection point, and
wherein the reflection point is configured to reflect optical signals of the at least two wavelengths, or the reflection point is configured to reflect an optical signal of a wavelength in the M wavelengths other than the at least two wavelengths.

12. The system according to claim 9, wherein the optical signals of the M wavelengths and the at least one piece of feedback information are carried in a physical layer operations administration and maintenance (PLOAM) message, an optical network terminal management and control interface (OMCI) message, or a data channel.

13. A system, wherein the system comprises:
an optical line termination (OLT); and
at least one optical network unit (ONU),
wherein the OLT is configured to send optical signals of M wavelengths to the at least one ONU, wherein the M wavelengths are different from each other, and M is an integer greater than 1,
wherein a first ONU in the at least one ONU is configured to:
determine, based on magnitudes of received optical power values of the optical signals of the M wavelengths, R wavelengths corresponding to the first ONU, wherein R is an integer greater than or equal to 2;
determine, based on at least two wavelengths of the R wavelengths, port information of a first optical splitter corresponding to the first ONU, wherein a first branch port of the first optical splitter corresponds to the at least two wavelengths; and
send feedback information to the OLT, wherein the feedback information indicates the port information,
wherein the OLT is configured to determine the port information based on the feedback information, and
wherein M is less than a total number of branch ports of the first optical splitter.

14. The system according to claim 13,
wherein optical power values of optical signals corresponding to the R wavelengths are less than a first preset value, or
wherein the optical power values of the optical signals corresponding to the R wavelengths are greater than a second preset value, or
wherein the R wavelengths correspond to R minimum optical power values of the optical power values of the optical signals of the M wavelengths, or wherein the R wavelengths correspond to R maximum optical power values of the optical power values of the optical signals of the M wavelengths, or wherein, when there is a difference greater than a third preset threshold in differences between the optical power values of the optical signals of the M wavelengths, the R wavelengths correspond to the R minimum optical power values of the optical power values of the optical signals of the M wavelengths, or wherein, when there is the difference greater than the third preset threshold in the differences between the optical power values of the optical signals of the M wavelengths, the R wavelengths correspond to the R maximum optical power values of the optical power values of the optical signals of the M wavelengths.

15. The system according to claim 13, wherein the first branch port is provided with a reflection point, and wherein the reflection point is configured to reflect optical signals of the at least two wavelengths, or the reflection point is configured to reflect an optical signal of a wavelength in the M wavelengths other than the at least two wavelengths.

16. The system according to claim 13, wherein the optical signals of the M wavelengths and the feedback information are carried in a physical layer operations administration and maintenance (PLOAM) message, an optical network terminal management and control interface (OMCI) message, or a data channel.

* * * * *